(12) United States Patent
Jung et al.

(10) Patent No.: US 7,944,877 B2
(45) Date of Patent: May 17, 2011

(54) APPARATUS AND METHOD FOR ALLOCATING RESOURCES IN AN ORTHOGONAL FREQUENCY DIVISION MULTIPLE ACCESS MOBILE COMMUNICATION SYSTEM

(75) Inventors: Jung-Soo Jung, Seongnam-si (KR); Dae-Gyun Kim, Suwon-si (KR); Beom-Sik Bae, Suwon-si (KR); Hwan-Joon Kwon, Hwaseong-si (KR); Yu-Chul Kim, Seoul (KR)

(73) Assignee: Qualcomm Incorporated, San Diego, CA (US)

( * ) Notice: Subject to any disclaimer, the term of this patent is extended or adjusted under 35 U.S.C. 154(b) by 992 days.

(21) Appl. No.: 11/748,790

(22) Filed: May 15, 2007

(65) Prior Publication Data
US 2007/0280166 A1 Dec. 6, 2007

(30) Foreign Application Priority Data
May 15, 2006 (KR) .................... 10-2006-0043590

(51) Int. Cl.
*H04W 4/00* (2009.01)
*H04W 72/00* (2009.01)
*H04B 7/216* (2006.01)
*H04J 3/16* (2006.01)

(52) U.S. Cl. ........ 370/329; 370/330; 370/341; 370/342; 370/437; 455/450; 455/451; 455/452.1; 455/452.2

(58) Field of Classification Search .................. 370/331, 370/329, 208, 395.21–395.43, 330, 341–342, 370/427; 455/450–453
See application file for complete search history.

(56) References Cited

U.S. PATENT DOCUMENTS
6,819,930 B1 11/2004 Laroia et al.
2007/0218915 A1* 9/2007 Yang et al. .................... 455/450

FOREIGN PATENT DOCUMENTS
| KR | 1020050123041 | 12/2005 |
| KR | 1020060004870 | 1/2006 |
| WO | WO2004114564 | 12/2004 |
| WO | WO2005086384 | 9/2005 |

* cited by examiner

*Primary Examiner* — George Eng
*Assistant Examiner* — Wesley L Kim
(74) *Attorney, Agent, or Firm* — McDermott Will & Emery

(57) ABSTRACT

A method for receiving resources allocated from a base station by a terminal in an OFDMA mobile communication system. The method includes receiving, for a data channel, a number of first components, which indicates an amount of resources used with a first resource allocation scheme, and a number of second components, which indicates an amount of resources used with a second resource allocation scheme, from the base station over a common control channel; determining first and second identifier lengths of channel elements for the first and second resource allocation schemes according to the number of first components and the number of second components; receiving resource allocation information including an identifier indicating at least one channel element allocated to the terminal, over a data control channel using one of the identifier lengths; and transmitting and receiving data over a resource of a channel element indicated by the received identifier.

32 Claims, 14 Drawing Sheets

APPARATUS AND METHOD FOR ALLOCATING RESOURCES IN AN ORTHOGONAL FREQUENCY DIVISION MULTIPLE ACCESS MOBILE COMMUNICATION SYSTEM

PRIORITY

This application claims priority under 35 U.S.C. §119(a) to a Korean Patent Application filed in the Korean Intellectual Property Office on May 15, 2006 and assigned Serial No. 2006-43590, the disclosure of which is incorporated herein by reference.

BACKGROUND OF THE INVENTION

1. Field of the Invention

The present invention relates generally to all apparatus and method for allocating resources in a wireless communication system, and in particular, to an apparatus and method for allocating resources in an Orthogonal Frequency Division Multiple Access (OFDMA) mobile communication system

2. Description of the Related Art

Wireless communication systems have been developed for situations where it is not possible to connect fixed wired networks to mobile terminals. Typical wireless communication systems include not only a normal mobile communication system providing voice and data services, but also a Wireless Local Area Network (WLAN), a Wireless Broadband (WiBro) system, a Mobile Ad Hoc network, and the like.

Recently, in wireless communication systems, Orthogonal Frequency Division Multiplexing (OFDM) is under active research and development, and has been put into practice. OFDM, a scheme for transmitting data using, multiple carriers, is a kind of Multi Carrier Modulation (MCM) that converts a serial input symbol stream into parallel symbol streams, and modulates each of them with multiple orthogonal sub-carriers, i.e. sub-carrier channels, before transmission.

A wireless communication system employing this multi-carrier transmission scheme was first applied to military radios in the late 1950s, and OFDM, which is the typical multi-cannier transmission scheme for overlapping multiple orthogonal sub-carriers, was developed in the 1970s. OFDM converts a serial input symbol stream into parallel symbol streams, and modulates them with multiple orthogonal sub-carriers before transmission, and the OFDM scheme can be widely applied to digital transmission technologies such as Digital Audio Broadcasting (DAB), Digital Television, Wireless Local Area Network (WLAN), Wireless Asynchronous Transfer Mode (ATM), and the like.

It is known that OFDM, a system suitable for the wireless communication environment where Line of Sight (LOS) is not guaranteed in multiple paths, can provide an efficient platform for high-speed data transmission with its advantage of being robust against multi-path fading. That is, OFDM can efficiently overcome frequency selective fading because it divides the entire channel into multiple orthogonal narrow-band sub-channels before transmission.

Also, OFDM is most effective for high-speed data transmission because it can cancel Inter-Symbol Interference (ISI) by inserting, into a header of a symbol, a periodic Cyclic Prefix (CP) which is longer in length than a delay spread of a channel. Due to these advantages, the IEEE 802.16a standard has been established, and IEEE 802.16a supports a Single-Carrier System, OFDM, and OFDMA.

OFDMA is a multiple access scheme that divides a frequency domain into sub-channels each composed of multiple sub-carriers, divides a time domain into multiple time slots, and then performs resource allocation taking both the time and frequency domains into account by independently allocating the sub-channels to individual users, thereby enabling accommodation of multiple users with the limited frequency resources.

FIG. 1 illustrates exemplary resources in time and frequency domains in a general OFDM wireless communication system.

In the common OFDM system, because it is typical that one modulation symbol (for example, a Quadrature Phase Shift Keying (QPSK) or a 16-ary Quadrature Amplitude Modulation (16QAM) symbol) is transmitted over one sub-carrier, it can be considered that the sub-carriers are unit resources. In FIG. 1, the horizontal axis indicates the time axis, and the vertical axis indicates the frequency axis. Reference numeral 101 denotes one sub-carrier, and reference numeral 102 denotes one OFDM symbol. Commonly, as shown in FIG. 1, one OFDM symbol 102 is composed of multiple sub-carriers. Also, the common OFDM system groups multiple OFDM symbols as shown by reference numeral 103, and defines each group as a basic transmission unit. In the specification, the basic transmission unit composed of several OFDM symbols will be referred to as a Transmission Time Interval (TTI). Therefore, as shown in FIG. 1, one TTI is composed of multiple OFDM symbols. In addition, it can be noted that if one smallest rectangle shown in FIG. 1 is called a 'time-frequency bin', one TTI is composed of multiple time-frequency bins.

In the common OFDM system, it is typical that one TTI is composed of multiple physical channels. The term 'physical channel' refers to channels for transmitting different kinds of information, like a paging channel, packet data channel, packet data control channel, reverse scheduling channel, etc., all of which are needed in the common mobile communication system. For example, referring to FIG. 1, in one TTI, some resources, i.e. some time-frequency bins, are used for the paging channel; some resources are used for a common control channel for providing system information; some resources are used for the packet data channel for transmitting user data; and some resources are used for the packet data control channel for transmitting control information used for demodulation of the packet data channel. Although not mentioned above, it should be noted that there are other possible physical channels for other objects.

As described above, the common OFDM wireless communication system has 2-dimensional resources in the time and frequency domains, and the time-frequency 2-dimensional resources can be subdivided into small groups and then allocated to multiple terminals. Because the terminals may be different from each other in terms of the amount of their necessary resources, an efficient agreement on which resource, i.e. time-frequency bin, is allocated to each terminal should be made between a transmitter and a receiver, and the allocated resources could be able to be indicated accordingly. For example, if 5000 bins exist in one TTI as described above, the transmitter should be able to efficiently provide the receiver with information indicating that it has allocated bins #1~#100 to a first receiver, and bins #101~#600 to a second receiver. The method of indicating one allocated resource in the manner of indicating which sub-carrier in which OFDM symbol is allocated to a terminal on a sub-carrier by sub-carrier basis, is very inefficient. This is because the conventional method needs too much information to notify a certain terminal of the resource allocated thereto.

To solve this problem, the allocated resources can be indicated with use of a Localized Resources Channel (LRCH) scheme that for 2-dimensional resources, i.e. multiple time-frequency bins, in one TTI, configures a channel by grouping adjacent resources among the 2-dimensional resources in the TTI and indicates the channel, and of a Distributed Resources Channel (DRCH) scheme that configures a channel by grouping resources being spaced according to a particular rule, among the 2-dimensional resources in one TTI and indicates the channel.

DRCH(N, k) as used herein refers to the resources corresponding to a $k^{th}$ group when time and frequency resources in a TTI are divided into N groups having a distributed or scattered pattern.

FIG. 2 illustrates an example of allocating resources using the DRCH scheme in a general OFDMA system.

Referring to FIG. 2, there are 8 OFDM symbols in one TTI. The OFDM symbols are indicated by L=0 through L=7. One OFDM symbol is composed of 32 sub-carriers. The 32 sub-carriers included in one OFDM symbol are indicated by n=0 through n=31. In FIG. 2, the resources corresponding to DRCH(8, 0) with N=8 and k=0 are shown by the hatched rectangles denoted by reference numeral 200. The resources of DRCH(8, 0) are configured in the following manner.

In each OFDM symbol, 32 sub-carriers are divided into N (N=8 in FIG. 2) groups. Sub-carriers included in each group are characterized in that they are separated by an equal distance in the frequency axis. That is, sub-carriers belonging to a group 0 are sub-carriers corresponding to n={0, 8, 16, 24}; sub-carriers belonging to a group 1 are sub-carriers corresponding to n={1, 9, 17, 25}; sub-carriers belonging to a group 2 are sub-carriers corresponding to n={2, 1, 18, 26}; and sub-carriers belonging to a group 3 are sub-carriers corresponding to n={3, 11, 19, 27}. In addition, sub-carriers belonging to a group 4 are sub-carriers corresponding to n={4, 12, 20, 28}; sub-carriers belonging to a group 5 are sub-carriers corresponding to n={5, 13, 21, 29}; sub-carriers belonging to a group 6 are sub-carriers corresponding to n={6, 14, 22, 30}; and sub-carriers belonging to a group 7 are sub-carriers corresponding to n={7, 15, 23, 3}.

For N=8, sub-carriers included in each OFDM symbol are characterized in that they are separated by an equal distance in the frequency domain. Finally, resources in the frequency and time domains corresponding to DRCH(8, 0) are defined by a unique sequence S of each base station. The sequence S has as many elements as the number of OFDM symbols included in one TTI. That is, because element positions of DRCH are designated every symbol, the sequence S has as many elements as the number of symbols, for example, elements 0.3 and 1. In the case of FIG. 2, the sequence S={0, 3, 1, 7, 2, 6, 4, 5}. The sequence S is an index designating a group in each OFDM symbol.

In other words, in a base station with S={0, 3, 1, 7, 2, 6, 4, 5}, resources in the frequency and time domains corresponding to DRCH(8, 0) are defined as the resources included in DRCH(8, 0) that gathers sub-carriers included in each of a group 0 of a first OFDM symbol, group 3 of a second OFDM symbol, a group 1 of a third OFDM symbol, a group 7 of a fourth OFDM symbol, a group 2 of a fifth OFDM symbol, a group 6 of a sixth OFDM symbol, a group 4 of a seventh OFDM symbol, and a group 5 of an eighth OFDM symbol in the corresponding TTI.

The foregoing can be expressed in a general manner as follows. In the base station with S={0, 3, 1, 7, 2, 6, 4, 5}, resources in the frequency and time domains corresponding to DRCH(8, k) are sub-carriers corresponding to groups expressed as {(0+k) % N, (3+k) % N, (1+k) % N, (7+k) % N, (2+k) % N, (6+k) % N, (4+k) % N, (5+k) % N} in OFDM symbols in the TTI. Here, "%" denotes a modulo operation.

Therefore, it can be noted in FIG. 2 that resources in the frequency and time domains corresponding to DRCH(8, 4) 202 are achieved by gathering sub-carriers included in {4%8, 7%8, 5%8, 11%8, 6%8, 10%8, 8%8, 9%8}, i.e. in groups corresponding to {4, 7, 5, 3, 6, 2, 0, 1}, in OFDM symbols in the TTI.

LRCH(N, k), which is another resource allocation unit definition method, refers to the resources corresponding to a $k^{th}$ group when time and frequency resources in a TTI are divided into N groups having a localized pattern.

FIG. 3 illustrates an example of allocating resources using the LRCH scheme in a general OFDMA system.

Referring to FIG. 3, it can be noted that there are 8 OFDM symbols in one TTI, and the OFDM symbols are indicated by L=0 through L=7. One OFDM symbol is composed of 32 sub-carriers. The 32 sub-carriers included in one OFDM symbol are indicated by n=0 through n=31.

In FIG. 3, resources corresponding to LRCH(4, 0) with N=4 and k=0 are shown by reference numeral 300. The 64 sub-carriers with n=0~7 included in 8 OFDM symbols in the TTI constitute LRCH(4, 0) 300. The 64 sub-carriers with n=8~15 included in 8 OFDM symbols in the TTI constitute LRCH(4, 1) 302. The 64 sub-carriers with n=16~23 included in 8 OFDM symbols in the TTI constitute LRCH(4, 2). The 64 sub-carriers with n=24~31 included in 8 OFDM si symbols in the TTI constitute LRCH(4, 3).

The resource indication methods based on DRCH and LRCH can be simultaneously applied for the same time-frequency resources. For example, it is possible to first divide time-frequency resources into a specified number of DRCHs, for allocation, and then re-divide the remaining resources into LRCHs, for allocation. On the contrary, it is also possible to first divide the time-frequency resources into LRCHs, for allocation, and then re-divide the remaining resources into DRCHs, for allocation.

FIGS. 4 and 5 illustrate examples of simultaneously using DRCH and LRCH for the same time-frequency resources.

FIG. 4 illustrates a resource allocation example of configuring LRCH(4,0) 404, LRCH(4,1) 406, LRCH(4,2) 408 and LRCH(4,3) 410 using the resources left after first allocating DRCH(16,0) 400 and DRCH(16,8) 402 in a general OFDMA system.

FIG. 5 illustrates an example of configuring DRCHs 502, 504 and 506 using the resources left after first allocating LRCH(4,2) 500 in a general OFDMA System.

The foregoing OFDM mobile communication system can allocate information on DRCH and LRCH data channels configured as shown in FIGS. 4 and 5, to terminals over a particular Data Control Channel (DCH) that all terminals receive.

SUMMARY OF THE INVENTION

An aspect of the present invention is to address at least the above problems and/or disadvantages and to provide at least the advantages described below. Accordingly an aspect or the present invention is to provide an apparatus and method for allocating forward and reverse time-frequency resources to terminals in an OFDMA mobile communication system.

Another aspect of the present invention is to provide an apparatus and method for allocating forward and reverse time-frequency resources to terminals using the minimum information in an OFDMA mobile communication system.

Another aspect of the present invention is to provide an apparatus and method for allocating forward and reverse time-frequency resources to terminals when the resources are allocated with different schemes in all OFDMA mobile communication system.

According to one aspect of the present invention, there is provided a method for receiving resources allocated from a base station by a terminal in an Orthogonal Frequency Division Multiple Access (OFDMA) mobile communication system. The method includes receiving, for a data channel, information of a number of first components, which indicates an amount of resources used with a first resource allocation scheme, and a number of second components, which indicates an amount of resources used with a second resource allocation scheme, from the base station over a common control channel; determining first and second identifier lengths of channel elements for the first and second resource allocation schemes according to the information of the number of first components and the number of second components; receiving resource allocation information including an identifier indicating at least one channel element allocated to the terminal, over a data control channel using one of the identifier lengths; and transmitting and receiving data over a resource of a channel element indicated by the received identifier.

According to another aspect of the present invention, there is provided a method for allocating resources to at least one terminal by a base station in an Orthogonal Frequency Division Multiple Access (OFDMA) mobile communication system. The method includes determining, for a data channel, a number of first components, which indicates an amount of resources used with a first resource allocation scheme, and a number of second components, which indicates an amount of resources used with a second resource allocation scheme; transmitting the number of first components and the number of second components to the terminal over a common control channel; determining identifier lengths of channel elements for the first and second resource allocation schemes according to the number of first components and the number of second components; transmitting resource allocation information including an identifier indicating at least one channel element allocated to the terminal, over a data control channel using one of the identifier lengths; and transmitting and receiving data over a resource of a channel element corresponding to the identifier.

According to further another aspect of the present invention, there is provided a terminal apparatus for receiving resources allocated from a base station in an Orthogonal Frequency Division Multiple Access (OFDMA) mobile communication system. The terminal apparatus includes a reception unit for receiving a signal transmitted by the base station; a control channel decoder for decoding a common control channel signal among the signals output from the reception unit, and outputting, for a data channel, a number of first components, which indicates an amount of resources used with a first resource allocation scheme, and a number of second components, which indicates an amount of resources used with a second resource allocation scheme; and a controller for determining identifier lengths of channel elements according to the number of first components and the number of second components, and receiving resource allocation information.

According to yet another aspect of the present invention, there is provided a base station apparatus for allocating resources to at least one terminal in an Orthogonal Frequency Division Multiple Access (OFDMA) mobile communication system. The base station apparatus includes a downlink scheduler and controller for generating information on resources to be allocated to the terminal, determining, for a data channel, a number of first components, which indicates an amount of resources used with a first resource allocation scheme, and a number of second components, which indicates an amount of resource used with a second resource allocation scheme, determining a length of a channel element identifier according to the number of first components and the number of second components constituting the data channel, and generating all identifier indicating at least one channel element to be allocated to transmit data to the terminal using the identifier length; a common control channel symbol generator for transmitting the number of first components and the number of second components over a common control channel; and a control channel symbol generator for transmitting resource allocation information including the generated identifier.

According to still another aspect of the present invention, there is provided a method for receiving resources allocated from a base station by a terminal in an Orthogonal Frequency Division Multiple Access (OFDMA) mobile communication system. The method includes receiving first resource allocation information and second resource allocation information, each including at least one channel element identifier indicating at least one channel element allocated for data transmission, over at least one data control channel; analyzing the first resource allocation information according to a previously known first channel element identifier length, to determine at least one channel element indicated by the first resource allocation information; determining a second channel element identifier length according to a number of remaining channel elements obtained by excluding a number of channel elements indicated by the first resource allocation information from a number of allocable channel elements; and analyzing the second resource allocation information according to the second channel element identifier length, to determine a channel element indicated by the second resource allocation information.

According to still another aspect of the present invention, there is provided a method for allocating resources to at least one terminal by a base station in an Orthogonal Frequency Division Multiple Access (OFDMA) mobile communication system. The method includes determining a first channel element identifier length according(to a number of allocable channel elements; determining first resource allocation information including at least one channel element identifier indicating at least one channel element allocated for data transmission, using the first channel element identifier length; when there is a need for additionally allocating resources, determining a second channel element identifier length according to a number of remaining channel elements obtained by excluding a number of at least one channel elements allocated through the first resource allocation information from a number of the channel elements; determining second resource allocation information including at least one channel element identifier indicating at least one channel element allocated for data transmission, using the second channel element identifier length; and transmitting the first resource allocation information and the second resource allocation information over at least one data control channel.

According to still another aspect of the present invention, there is provided a terminal apparatus for receiving resources allocated from a base station in an Orthogonal Frequency Division Multiple Access (OFDMA) mobile communication system. The terminal apparatus includes a reception unit for receiving first and second resource allocation information including at least one channel element identifier over at least one data control channel; and a controller for analyzing the first resource allocation information according to a previously known first channel element identifier length, to determine at least one channel element indicated by the first resource allocation information, determining a second channel element identifier length according to a number of remaining channel elements obtained by excluding a number of channel elements indicated by the first resource allocation information from a number of allocable channel elements, and an analyzing the second resource allocation information according to the second channel element identifier length, to determine a channel element indicated by the second resource allocation information.

According to still another aspect of the present invention, there is provided a base station apparatus for allocating resources to at least one terminal in an Orthogonal Frequency Division Multiple Access (OFDMA) mobile communication system. The base station apparatus includes a downlink scheduler and controller for determining a first channel element identifier length according to a number of allocable channel elements, determining first resource allocation information including at least one channel element identifier indicating at least one channel element allocated for data transmission using the first channel element identifier length, determining a second channel element identifier length according to a number of remaining channel elements obtained by excluding a number of at least one channel elements allocated through the first resource allocation information from a number of the channel elements, when there is a need for additionally allocating resources, and determining second resource allocation information including at least one channel element identifier indicating at least one channel element allocated for data transmission, using the second channel element identifier length; and a transmission unit for transmitting the first and second resource allocation information over at least one data control channel.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
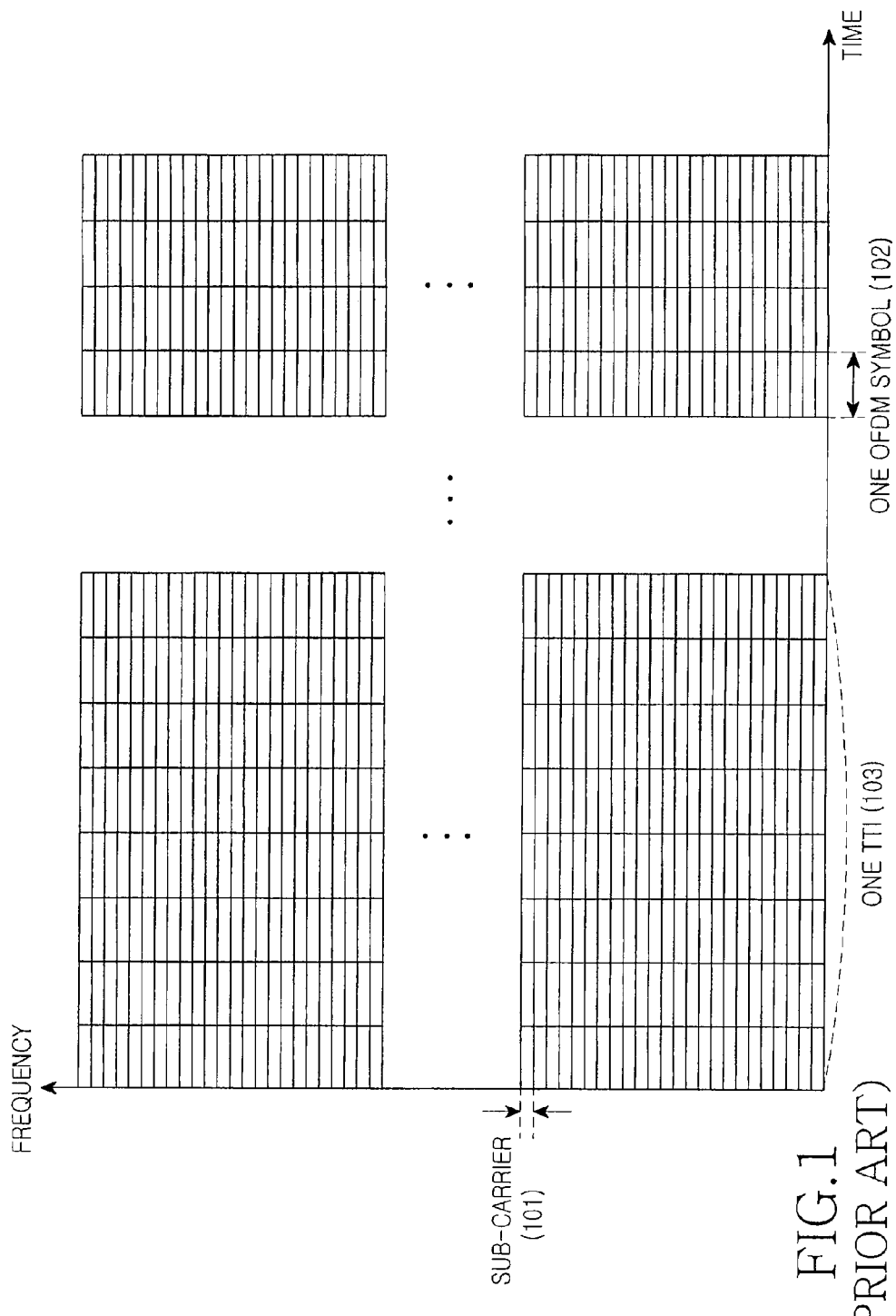
FIG. 1 is a diagram illustrating exemplary resources in time and frequency domains in a general OFDM wireless communication system
Figure 2:
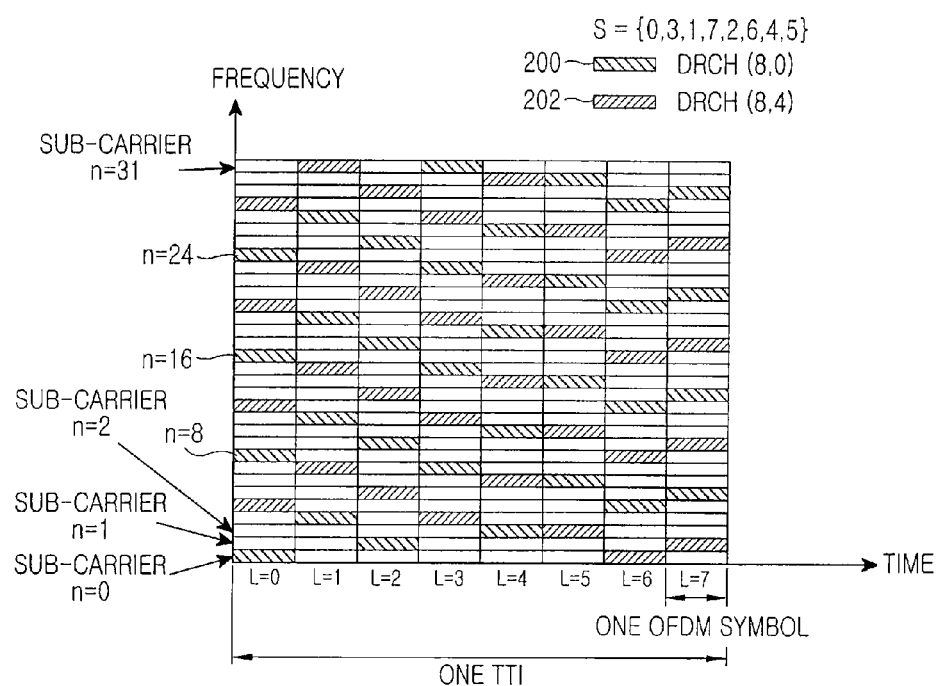
FIG. 2 is a diagram illustrating an example of allocating resources using a DRCH scheme in a general OFDMA system.
Figure 3:
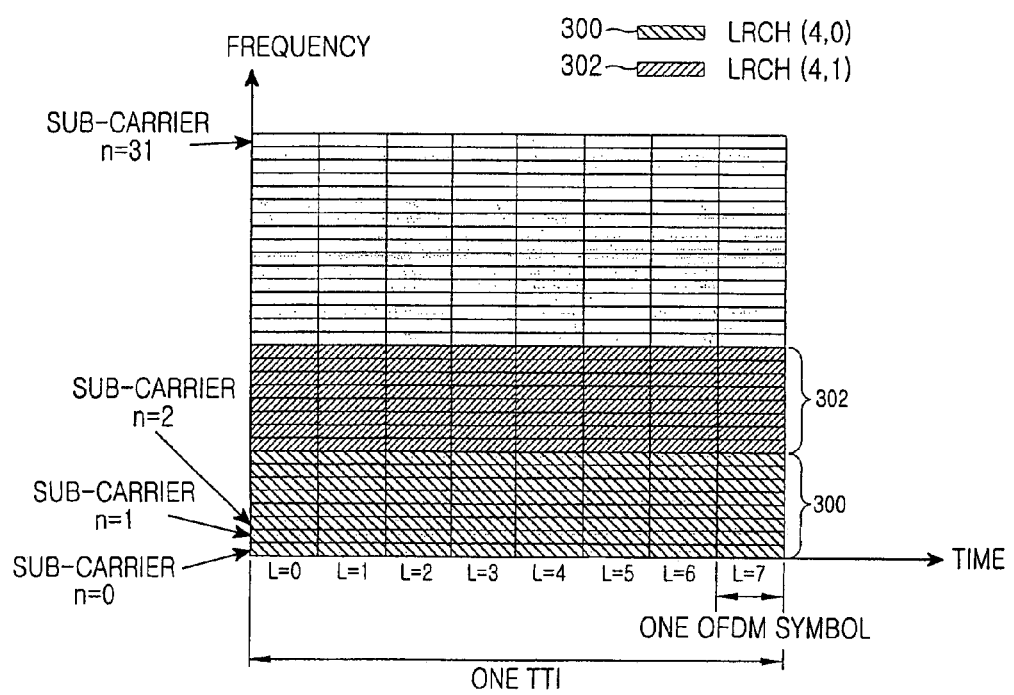
FIG. 3 is a diagram illustrating an example of allocating resources using an LRCH scheme in a general OFDMA system.
Figure 4:
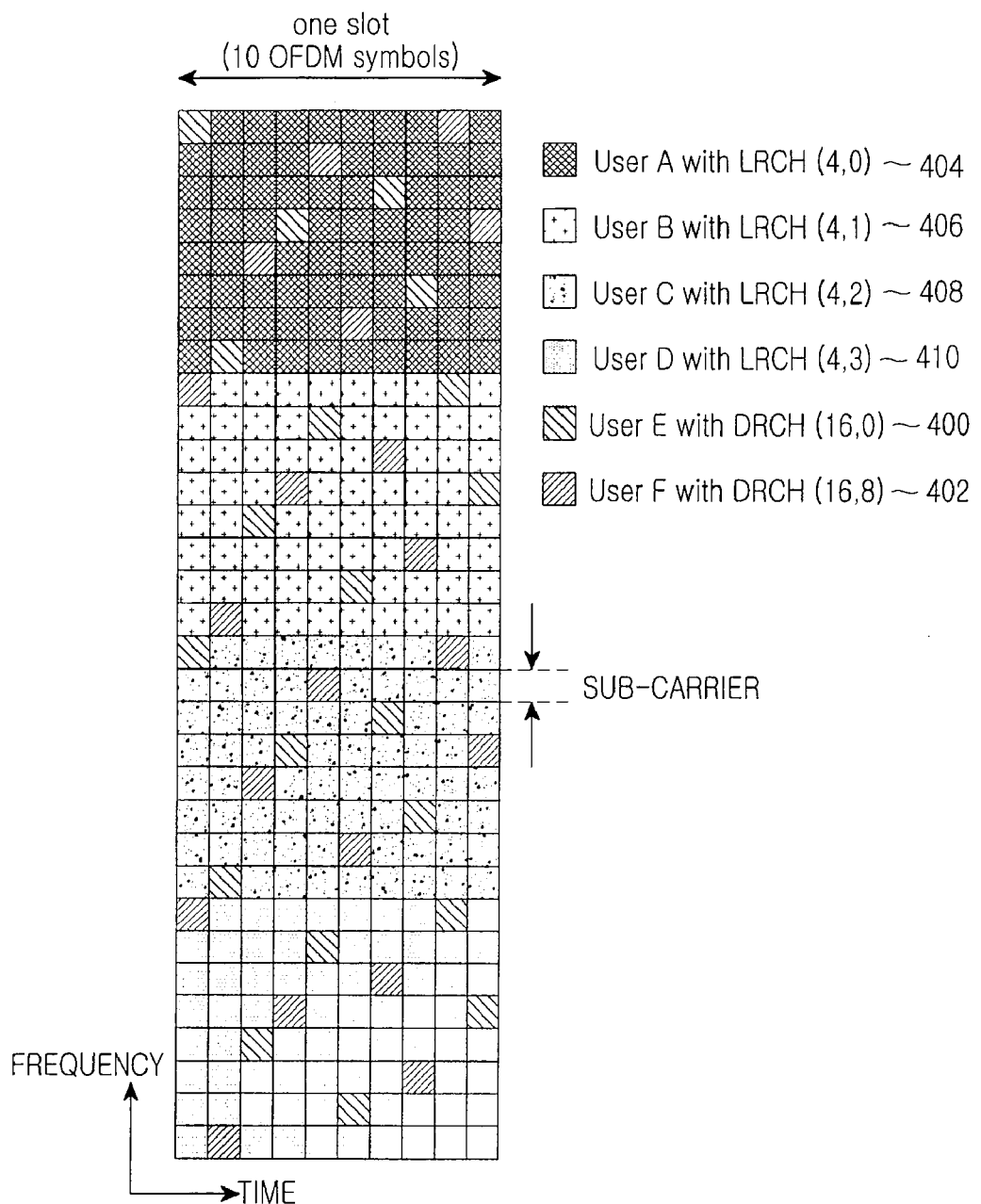
FIG. 4 is a diagram illustrating a resource allocation example of configuring LRCH(4,0), LRCH(4,1), LRCH(4,2) and LRCH(4,3) using the resources left after first allocating DRCH(16,0) and DRCH(16,8) in a general OFDMA system.
Figure 5:
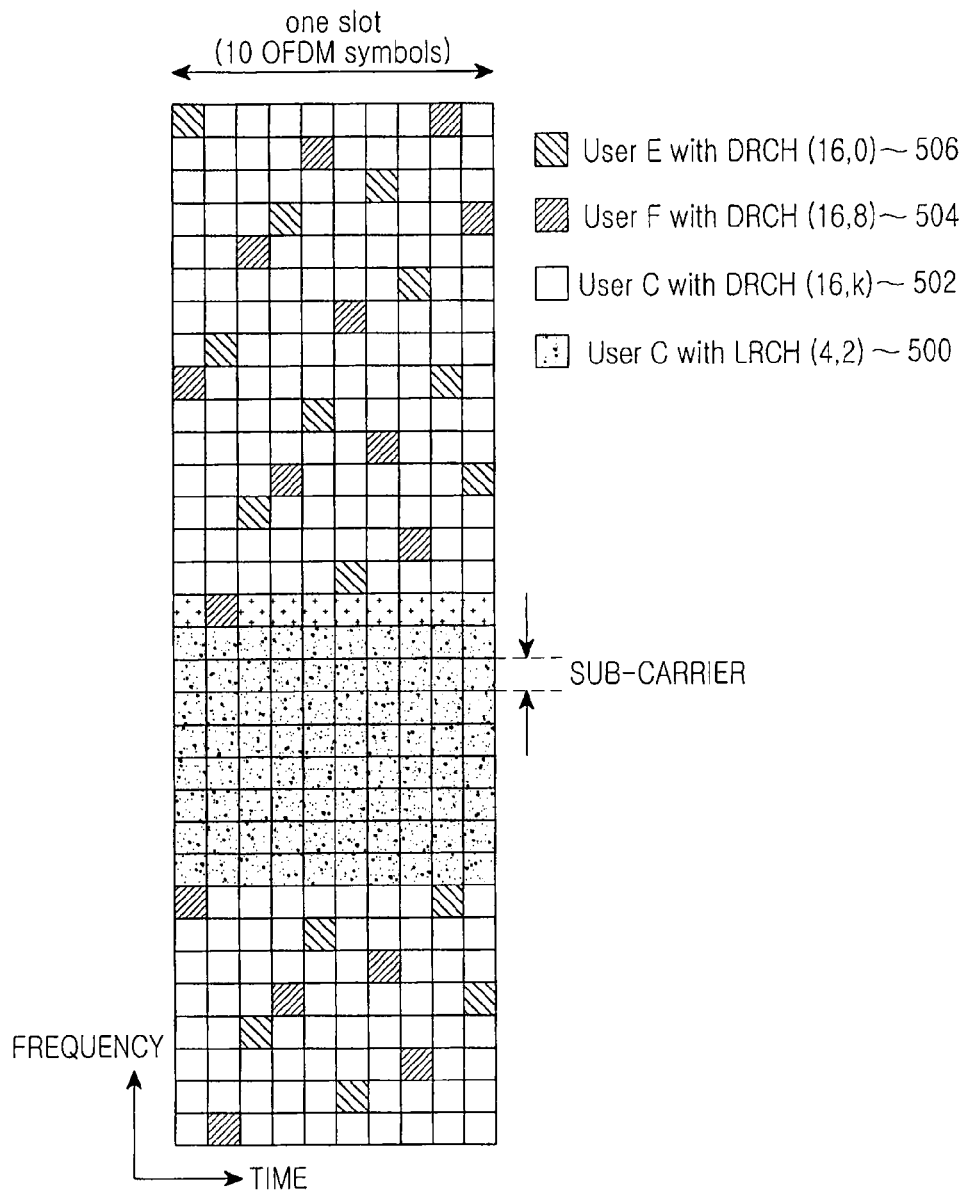
FIG. 5 is a diagram illustrating an example of configuring DRCHs using the resources left after first allocating LRCH (4,2) in a general OFDMA system.

Preferred embodiments of the present invention will now be described in detail with reference to the annexed drawings. In the drawings, the same or similar elements are denoted by the same reference numerals even though they are depicted in different drawings. In the following description a detailed description of known functions and configurations incorporated herein has been omitted for clarity and conciseness.

Although the following description will be made herein for an OFDMA system by way of example, the apparatus and method of the present invention is not necessarily limited to the OFDMA system, but can be used in any Frequency Division Multiple Access (FDMA) system. In addition, although the expression "base station allocates resources to terminals" will be used herein for convenience, the apparatus and method of the present invention can be applied to both forward transmission and reverse transmission.

The OFDM mobile communication system allocates forward resources configured with different schemes, for example DRCH and LRCH data channels, to terminals using a particular data control channel or a broadcast channel that all terminals receive.

For example, with use of a method of repeating an operation of writing in a common data control channel an identifier of each terminal and an identifier of a forward DRCH or LRCH resource allocated to the terminal, it is possible to indicate resources allocated to all terminals. In allocating resources of a forward link, if a length of a terminal identifier is k bits, n bits are needed to indicate particular DRCH and LRCH, and a size of Modulation and Coding Scheme (MCS) for receiving a data channel is m bits, this method should transmit as many bits as the number X (k+n+m) of terminals over a common data control channel. For example, if the number of terminals is X=40, k=10, n=8, and m=6, the method should transmit information of a total of 40×(10+8+6)=960 bits over a common control channel in order to transmit resource allocation information for 40 terminals. However, the common data control channel may have difficulty in carrying this large amount of information, because it should be received even at the terminal located farthest from the transmitter. To solve this problem, the present invention provides a scheme capable of efficiently allocating forward and reverse time-frequency resources to multiple terminals in a system using a Frequency Division Multiplexing (FDM)-based multiple access scheme.

In an embodiment of the present invention, when allocating resources to terminals, a base station allocates resource allocation units of the whole resources with two separate schemes (in this speciation, the two schemes are assumed to have a first scheme for configuring first components and a second scheme for configuring second components). For example, it is assumed that the base station allocates channel elements to terminals using the first components and the second components in a mixed manner.

Before a description of the present invention is given, definitions of the terms used in this specification are given as follows.

Channel Element: resource allocation unit

Channel Element Identifier (ID): information for indicating a channel element

Number of Components: the amount of resources used with a predetermined resource allocation scheme among the entire resources. For example, the number of first components indicates the number of channel elements used with a first resource allocation scheme, and it is assumed in the present invention that the entire channel elements are allocated with two types of resource allocation schemes; a first resource allocation scheme and a second resource allocation scheme.

Figure 6:
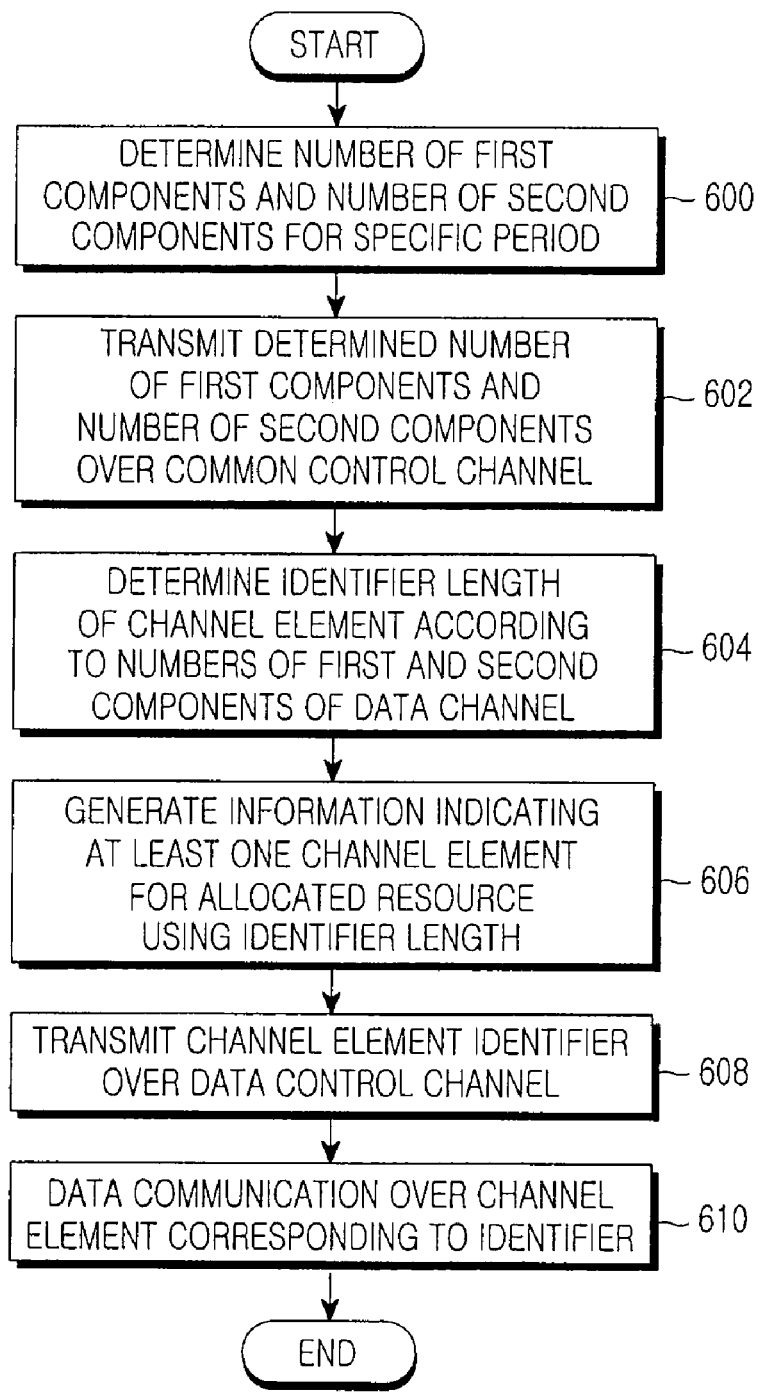
FIG. 6 is a flowchart illustrating a method in which a base station allocates resources to terminals according to an embodiment of the present invention.

FIG. 6 illustrates a method in which a base station allocates resources to terminals according to an embodiment of the present invention. In step 600, the base station determines, for a data channel, the number of first components, indicating the amount of resources used with a first resource allocation scheme, and the number of second components, indicating the amount of resources used with a second resource allocation scheme, for a specific period before transmitting data to terminals. In step 602, the base station transmits the determined information on the number of first components and the number of second components to terminals over a common control channel. The number of first components and the number of second components mean the number of channel elements resource-allocated according to the first resource allocation scheme and the number of channel elements resource-allocated according to the second resource allocation scheme, respectively.

In step 604, the base station can determine lengths of identifiers indicating channel elements for the first and second resource allocation schemes according to the number of first components and the number of second components of the data channel. For example, if the number of first components is 5, a corresponding channel element identifier length is 3 bits, and if the number of second components is 10, a corresponding channel element identifier length is 4 bits.

In step 606, the base station generates resource allocation information including an identifier indicating at least one channel element allocated to a terminal using the identifier lengths of the channel elements according to the number of first components and the number of second components of the data channel. For example, if the number of first components is 5, the channel element identifier according to the number of first components will be selected from among "000" through "100." and if the number of second components is 10, the channel element identifier according to the number of second components will be selected from among "0000" through "1001."

In step 608, the base station configures a data control channel including the resource allocation information determined in step 606 and transmits the data control channel, thereby transmitting resource allocation information to terminals. In step 610, the base station can communicate data over the resources of the channel elements corresponding to the identifiers.

Figure 7:
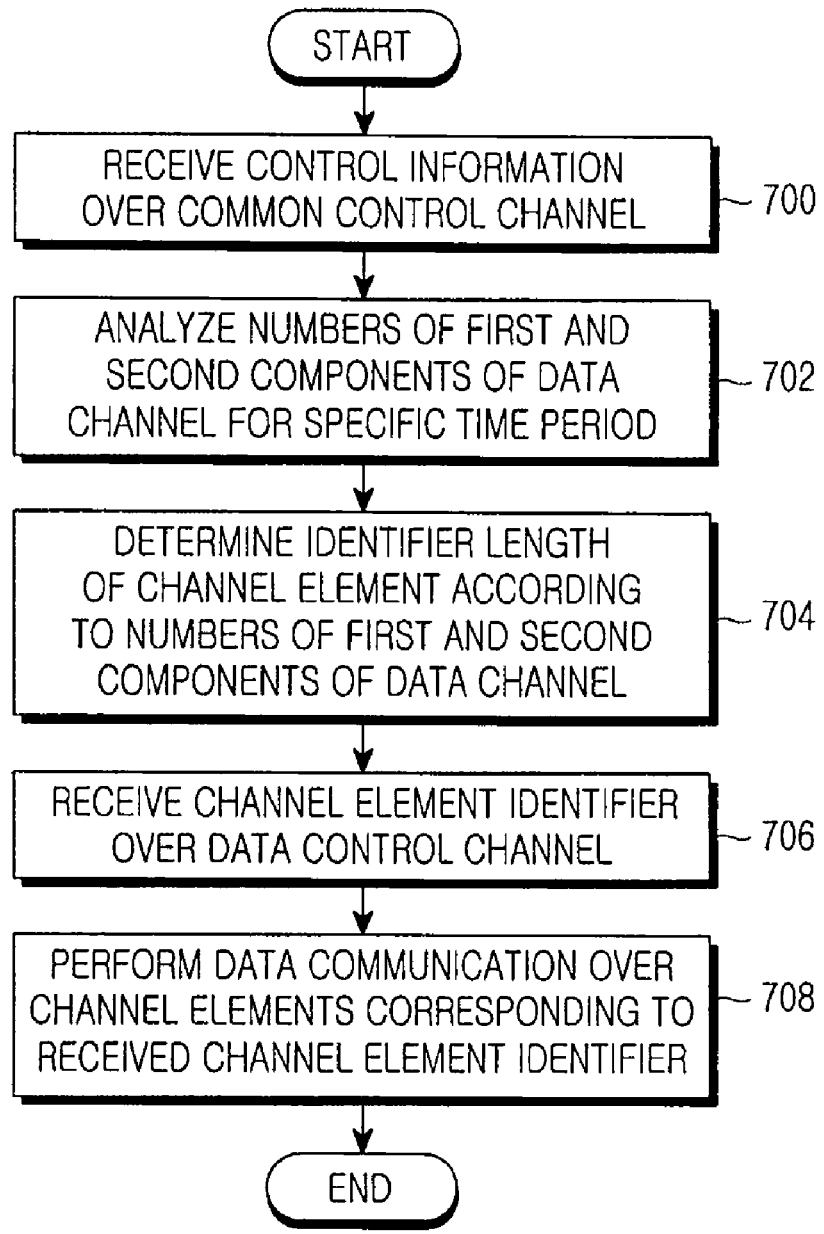
FIG. 7 is a flowchart illustrating a method in which a terminal is allocated resources from a base station according to an embodiment of the present invention.

FIG. 7 illustrates a method in which a terminal is allocated resources from a base station according to an embodiment of the present invention.

In step 700, the terminal receives control information including the number of first components and the number of second components over a common control channel transmitted from the base station. In step 702, the terminal can find out the number of first components and the number of second components of a data channel transmitted by the base station for a specific period using the control information of the common control channel received in step 700. Thereafter, in step 704, the terminal can determine lengths of identifiers indicating channel elements according to the number of first components and the number of second components of the data channel. For example, if the number of first components is 5, a length of the channel element identifier will be 3 bits.

After determining identifier lengths of the channel elements in step 704, the terminal receives in step 706 resource allocation information including an identifier indicating at least one channel element allocated thereto over a data control channel using the identifier lengths. In step 708, the terminal communicates data with the base station over the resources of the channel elements indicated by the received channel element identifier. The identifier indicating the at least one channel element is herein based on the determined identifier lengths, and can have a variable identifier length according to the number of allocable channel elements.

All embodiments in the present invention assume to allocate resources to more than one terminal using one Data Control Channel (DCCH).

Figure 8:
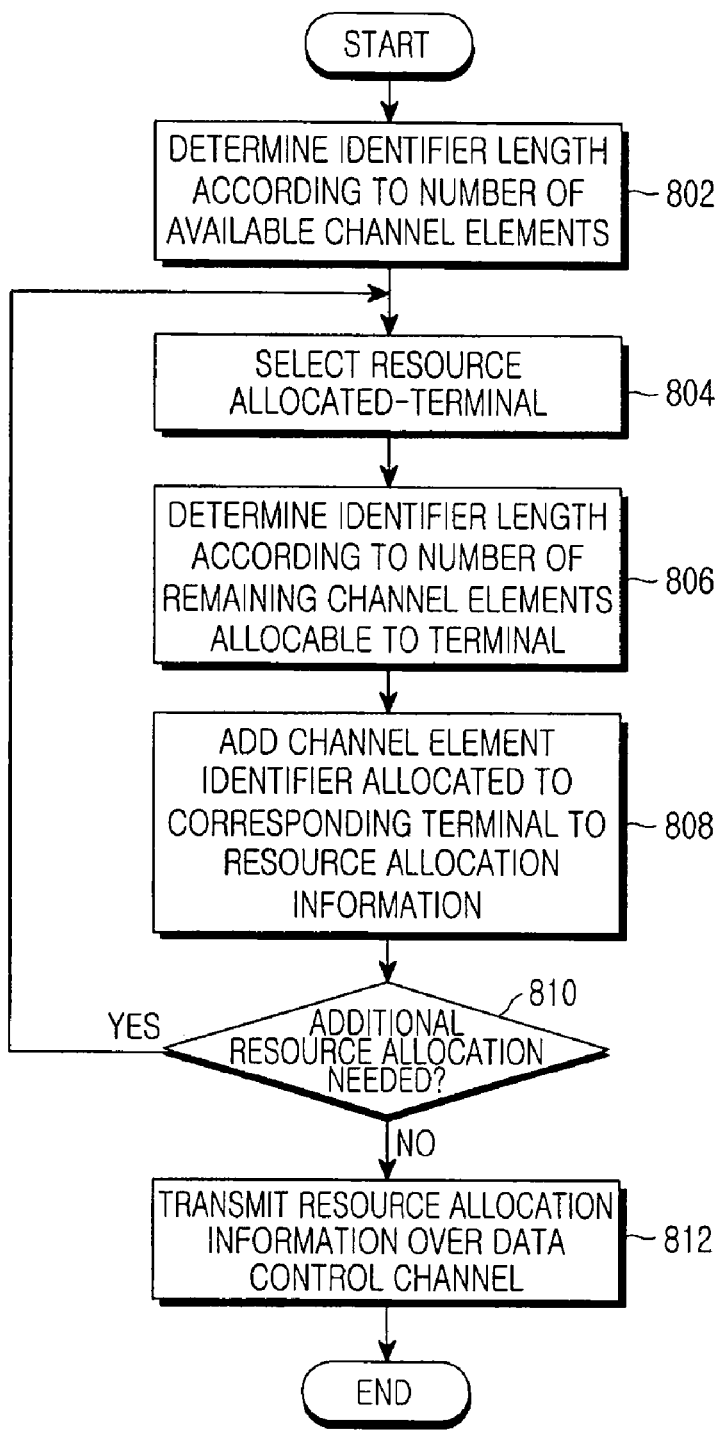
FIG. 8 is a flowchart illustrating a method in which a base station allocates resources to at least one terminal and transmits the allocation information over a data control channel according to another embodiment of the present invention.

FIG. 8 illustrates a method in which a base station allocates resources to at least one terminal and transmits the allocation information over a data control channel according to another embodiment of the present invention.

In step 802, the base station determines the number of available channel elements allocable in the corresponding data control channel, and determines an identifier length according to the number of the available channel elements. The number of the available channel elements, if there are multiple data control channels, can be determined using a method of subtracting the number of channel elements allocated in another data control channel from the number of channel elements of the entire resources. Thereafter, in step 804, the base station selects a terminal to which it will allocate resources over the corresponding data control channel. In the present invention, the base station can transmit resource allocation information for more than one terminal over one data control channel. In step 806, the base station determines a length of an identifier needed to indicate each channel element according to the number of the remaining channel elements allocable to the corresponding terminal. Thereafter, in step 808, the base station allocates a particular channel element to the corresponding terminal using the length of the identifier, determined in step 806, and adds the identifier of the corresponding channel element to the resource allocation information. The resource allocation information includes at least one channel element identifier allocated for data transmission.

In step 810, the base station determines whether there is a need for resource allocation to another terminal. If there is a further need for resource allocation, the base station returns to step 804 and repeatedly performs the process up to step 808. However, if it is determined in step 810 that there is no need for additional resource allocation, the base station transmits in step 812 the resource allocation information over the data control channel.

Figure 9:
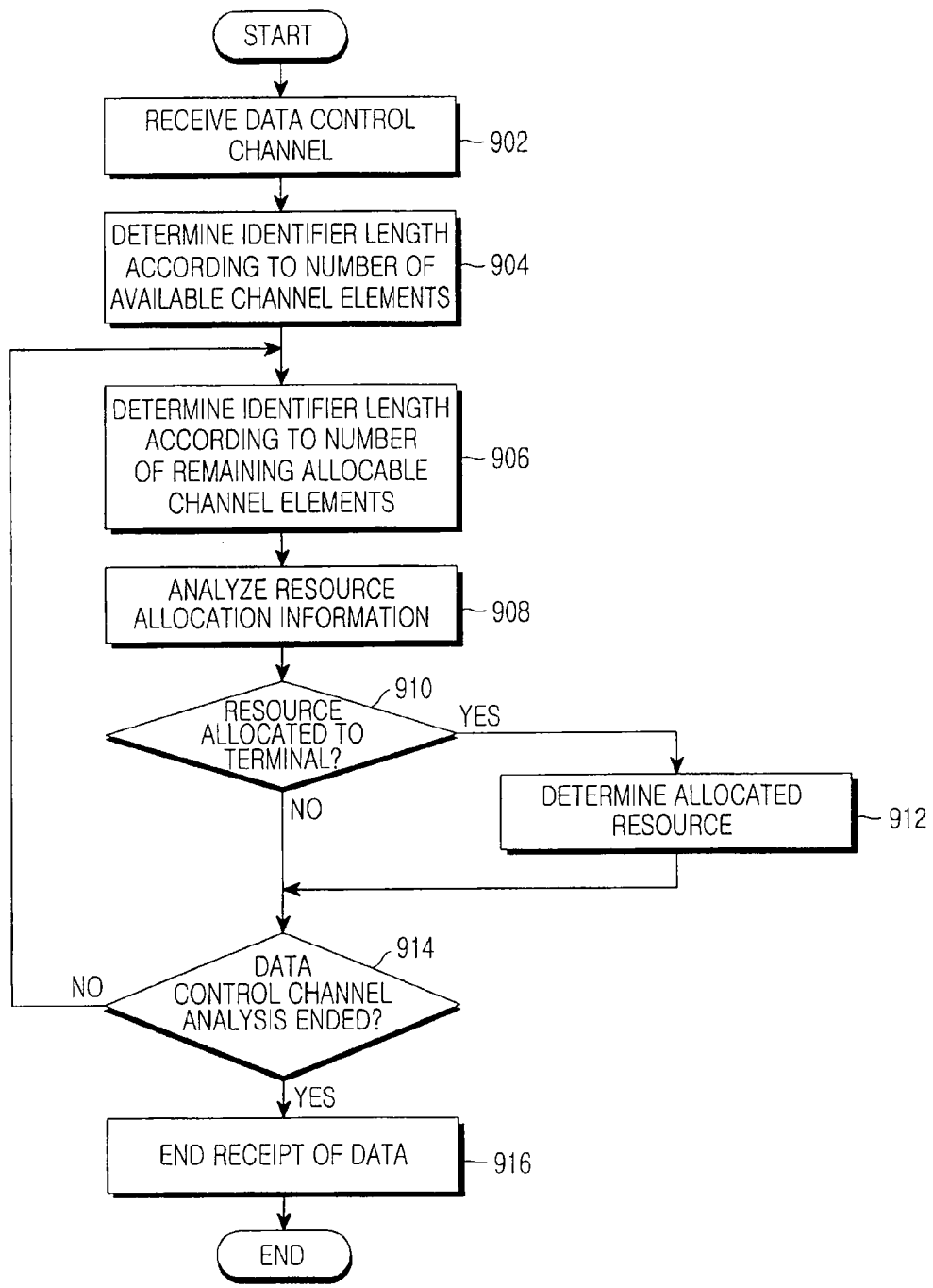
FIG. 9 is a flowchart illustrating a method in which a terminal receives a data control channel to be allocated resources from a base station according to an embodiment of the present invention.

FIG. 9 illustrates a method in which a terminal receives a data control channel to be allocated resources from a base station according to an embodiment of the present invention.

The terminal receives in step 902 a data control channel transmitted by the base station, and determines in step 904 an identifier length according to the number of available channel elements. The number of available channel elements, if there are multiple data control channels, can be determined using a method of subtracting the number of channel elements allocated in another data control channel from the number of the entire resources.

In step 906, the terminal determines a length of an identifier needed to indicate each channel element according to the number of the remaining allocable channel elements. In step 908, the terminal analyzes resource allocation information on the data control channel using the identifier length information determined in step 906. Thereafter, the terminal determines in step 910 whether the resource allocation information analyzed in step 908 indicates resources allocated to its own identifier (for example, MAC ID). If the analyzed resource allocation information indicates the resources allocated the terminal itself, the terminal proceeds to step 912 where it determines physical layer resources corresponding to the resource allocation information.

However, if it is determined in step 910 that the analyzed resource allocation information does not indicate the resources allocated to the terminal itself the terminal determines in step 914 whether the analysis of the data control channel has been completed. If there is remaining resource allocation information to be analyzed, the terminal repeats the process of steps 906 to 912. However, after completing the analysis of the entire resource allocation information in step 914, the terminal ends the reception of the data control channel in step 916.

An embodiment for the process of determining an identifier length of channel elements according to the number of available channel elements in the foregoing process will be described in detail below with reference to FIGS. 12 and 13. A description of FIGS. 12 and 13 of the present invention can be applied not only to steps 806 and 906 of FIGS. 8 and 9, but also to steps 604 and 704 of FIGS. 6 and 7.

Figure 10:
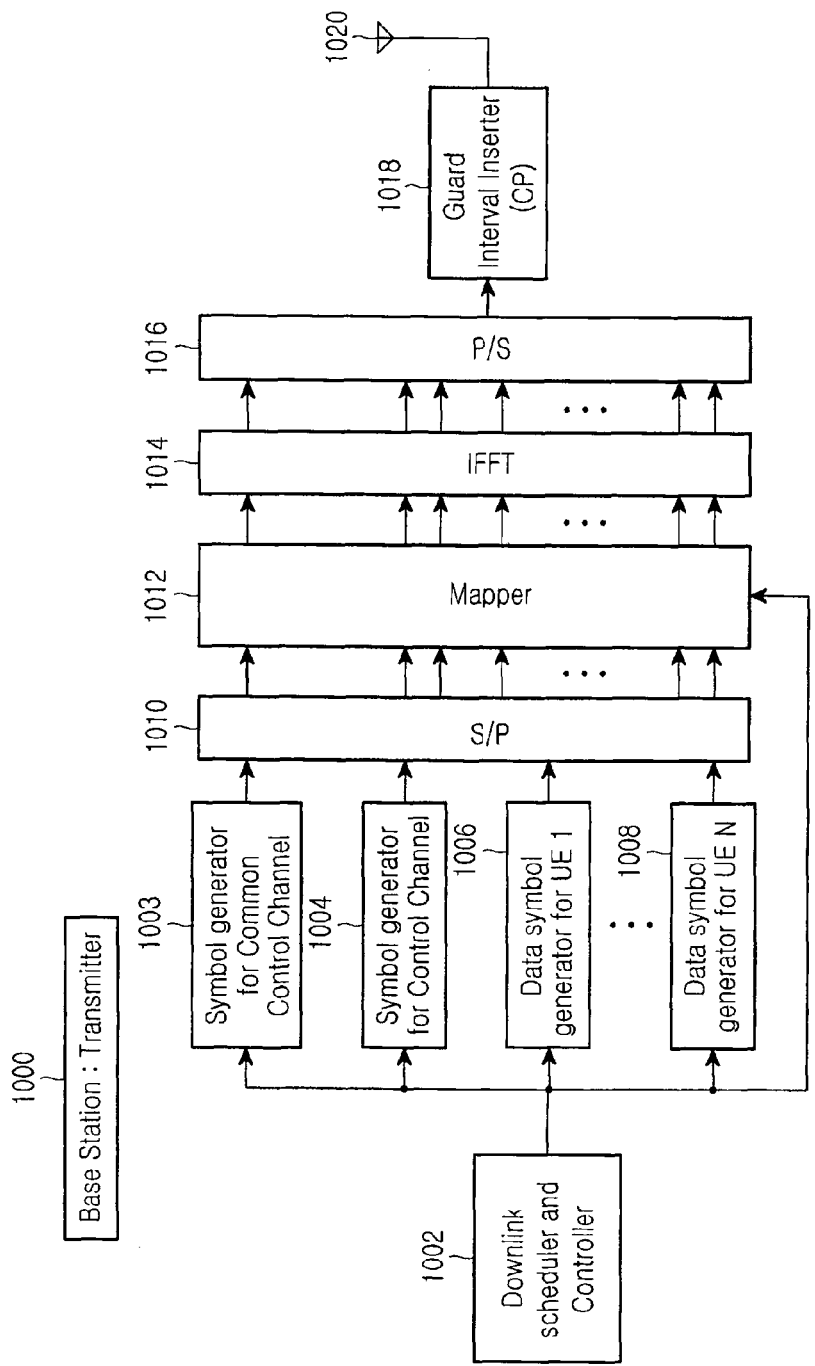
FIG. 10 is a block diagram illustrating a structure of a base station transmitter for allocating resources according to an embodiment of the present invention.

FIG. 10 illustrates a structure of a base station transmitter 1000 for allocating resources according to an embodiment of the present invention, which is a transmitter in a downlink (or forward link). A downlink scheduler & controller 1002 determines resource allocation information to be allocated for the downlink, and manages not only the information on the resources allocated to each terminal, but also the control information such as information about symbol generation and demodulation of a data channel of an error coding and modulation method for each individual terminal. The downlink scheduler & controller 1002 can control a control channel symbol generator 1004 such that the control channel symbol generator 1004 configures a data control channel using the method of the present invention according to the information on the resources allocated to each terminal. The downlink scheduler & controller 1002 can allocate not only forward resources but also reverse resources to at least one terminal.

The downlink scheduler & controller 1002 fixes the number of channel elements of each predetermined resource allocation scheme for configuring a data channel for a specific period according to an embodiment of the present invention (hereinafter, 'Hard-Positioning'), and transmits it to all terminals in the base station via a common control channel symbol generator 1003 over a common channel such as a broadcast channel or a common control channel, which is transmitted periodically or periodically. Assuming that there are two types of predetermined resource allocation schemes to efficiently indicate to which terminal which channel element is allocated during actual data transmission for the corresponding period, the downlink scheduler & controller 1002 determines an identifier length of channel elements according to the number of components, i.e., the number of channel elements determined according to each of a first resource allocation scheme and a second resource allocation scheme, and generates an identifier indicating at least one channel element for the resources to be allocated for data exchange with the terminal using the determined identifier length of the channel elements.

The control channel symbol generator 1004 transmits resource allocation information including the generated channel element identifier to the terminals over the data control channel, and transmission units 1010, 1012, 1014, 1016 and 1018 communicate data with the terminals over the channel elements corresponding to the identifier determined by the downlink scheduler & controller 1002.

The downlink scheduler & controller 1002 determines a channel element identifier length according to another method of the present invention in the following manner. There is a possible scheme of first determining the number of allocable available channel elements, and then determining a length of an identifier according to the determined number of channel elements.

When one or multiple data control channels exist, the number of available channel elements is determined using a method of subtracting the number of channel elements allocated in one data control channel or another data control channel from the number of the entire resources, and then a channel element identifier length can be determined according to the determined number of available channel elements. In order to determine a length of a channel element identifier according to the number of available channel elements as described above, the downlink scheduler & controller 1002 according to an embodiment of the present invention configures a data control channel corresponding to a particular Channel Quality Indicator (CQI) level to minimize the number of bits necessary for each data control channel, and can deliver allocation information only for the remaining resources, other than the resources allocated by a data control channel with a lower CQI level, when configuring a data control channel corresponding to the next CQI level. Also, when the downlink scheduler & controller 1002 allocates resources to multiple terminals over a particular data control channel to minimize the number of bits necessary for each data control channel, it can deliver allocation information only for the remaining resources, other than the resources allocated to other terminals before resource allocation to the corresponding terminal, to each terminal over the corresponding data control channel.

The control channel symbol generator 1004 transmits resource allocation in formation including a channel element identifier indicating allocated resources over a data control channel according to another embodiment of the present invention. Also, the control channel symbol generator 1004 can transmit not only the data control channel but also control information corresponding to the terminals allocated the resources.

A data symbol generator 1006 for a terminal 1 (or User Equipment I (UEI)) and a data symbol generator 1008 for a terminal N (UE N), which are symbol generators for a data channel, generate data symbols for individual terminals based on the control information output from the downlink scheduler & controller 1002. The common control channel symbol generator 1003, the control channel symbol generator 1004, the data symbol generator 1006 for terminal 1, and the data symbol generator 1008 for terminal N can include error correction coding, rate matching, interleaving, and symbol modulation blocks, but a detailed description thereof will be omitted because they are not related to the present invention. The symbols generated in the common control channel symbol generator 1003, the control channel symbol generator 1004, the data symbol generator 1006 for terminal 1, and the data symbol generator 1008 for terminal N are input to a serial-to-parallel (S/P) converter 1010 where they are converted into parallel signals and then Output to a mapper 1012. The mapper 1012 maps the data symbols to actual frequency resources allocated for individual terminals. The data symbols for all terminals, mapped to sub-carriers which are the actual frequency resources, are converted into time-domain signals in Inverse Fast Fourier Transformer (IFFT) 1014. The time-domain signals output from the IFFT 1014 are converted into a serial signal of OFDM samples in a parallel-to-serial (P/S) converter 1016, and then input to a (guard interval inserter 1018. The guard interval inserter 1018 inserts a guard interval using a Cyclic Prefix (CP) scheme that repeats some of the OFDM samples. The signal into which a guard interval is inserted by the guard interval inserter 1018 is transmitted over a wireless channel via an antenna 1020. In the base station transmitter 1000, the S/P converter 1010, the mapper 1012, the IFFT 1014, the P/S converter 1016, mid the guard interval inserter 1018 will be referred to as a transmission unit.

Figure 11:
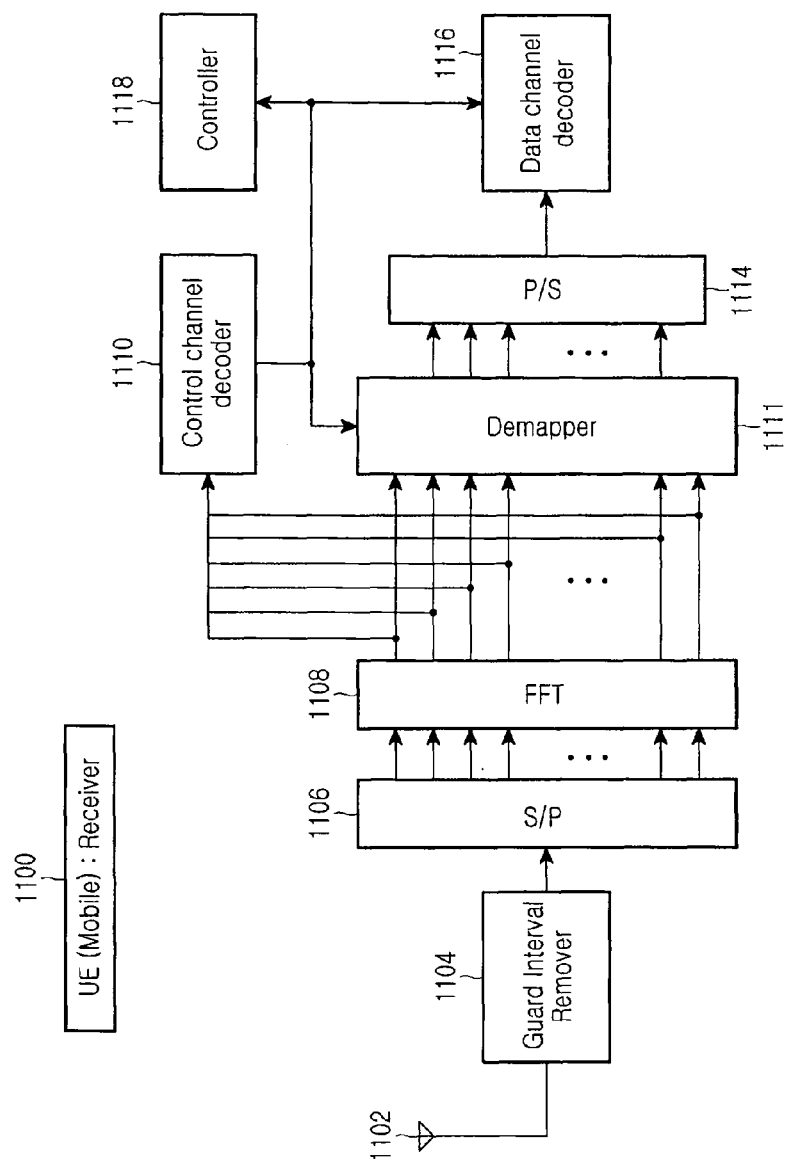
FIG. 11 is a block diagram illustrating a structure of a terminal receiver for receiving resources allocated from a base station according to an embodiment of the present invention.

FIG. 11 illustrates a structure of a terminal receiver 1100 for receiving resources allocated from a base station 1000 according to an embodiment of the present invention.

An antenna 1102 receives the signal transmitted from the base station transmitter 1000 over a wireless channel. A guard interval remover 1104 removes a guard interval signal inserted by the base station transmitter 1000, and outputs the guard interval-removed serial signal to a serial-to-parallel (S/P) converter 1106. The S/P converter 1106 converts the serial input signal into parallel signals, and outputs the parallel signals to a Fast Fourier Transformer (FFT) 1108. The FFT 1108 converts the time-domain signal into a frequency-domain signal. Of the signals output from the FFT 1108, the control signals received over a control channel are input to a control channel decoder 1110, and the control channel decoder 1110 decodes control information based on the received control signals. That is, according to an embodiment of the present invention, the control channel decoder 1110 decodes the common control channel signals among the signals output from the reception units 1104, 1106, 1108, 1111 and 1114, and outputs, to a controller 1118, control information including the number of first components, indicating the amount of resources used with a first resource allocation scheme, and the number of second components, indicating the amount of resources used with a second resource allocation scheme. In addition, the control channel decoder 1110 decodes the resource allocation information transmitted over the data control channel, and outputs the decoded information to the controller 1118. The control information decoded in the control channel decoder 1110 is input to the controller 1118, and the controller 1118 controls reception of a data channel according to the received control information. The controller 1118 receives from the control channel decoder 1110 the number of first components and the number of second components, finds out a ratio of the number of first components to the number of second components of the data channel that the base station transmits for a specific period, and can determine the number of bits for a length of an identifier that the base station has used to indicate the corresponding channel element using the number of first components and the number of second components.

In addition, as an example of methods of the present invention for determining a length of an identifier according to another embodiment of the present invention, the controller 1118 can determine the number of bits of a length of the channel element identifier used for allocating resources to each terminal in a data control channel corresponding to a particular CQI level. That is, the controller 1118 determines the number of available channel elements allocable in the data control channel, and the number of available channel elements, when there are multiple data control channels, can be determined using a method of subtracting the number of channel elements allocated in another data control channel from the number of the entire resources. Also, when resource allocation information for multiple terminals is transmitted over one data control channel, the controller 1118 can determine a length of a channel element identifier according to the number of available channel elements other than the already allocated resources.

A demapper 1111 receives the output signals of the FFT 1108, and extracts therefrom the data transmitted over the frequency resources corresponding to the terminal using the control information decoded by the control channel decoder 1110. The received signals for the corresponding terminal receiver 1110, separated by the demapper 1111, are input to a parallel-to-serial (P/S) converter 1114, and the P/S converter 1114 converts the parallel input signals into a serial signal, and outputs the resulting serial signal to a data channel decoder 1116. The data channel decoder 1116 decodes the converted serial signal using the control information from the control channel decoder 1110.

In the terminal receiver 1100 according to the present invention, the guard interval remover 1104, the S/P converter 1106, the FFT 1108, the demapper 1111, and the P/S converter 1114 will be referred to as a reception unit.

As described above, the present invention provides a method in which each base station of the system fixes the number of forward channel elements constituting a data channel for a specific period (Hard-Positioning), and transmits it to all its terminals over a common channel such as a broadcast channel or a common control channel, which is transmitted periodically or non-periodically. That is, when the data channel is configured with the first resource allocation scheme and the second resource allocation scheme, the base station fixes the number of components allocated with the first resource allocation scheme and the number of components allocated with the second resource allocation scheme, and can transmit the information on the fixed number of components to the terminals over the common control channel periodically or non-periodically.

However, when the base station configures the channel elements with the first resource allocation scheme and then configures the channel elements with the second resource allocation scheme, like in the prior art, without fixing the number of first components allocated with the forward first resource allocation scheme and the number of second components allocated with the second resource allocation scheme for a specific period, the base station must notify all its terminals of the use ratio of the first resource allocation scheme to the second resource allocation scheme every TTI. That is, the base station must indicate all channel elements allocated with the first resource allocation scheme among the time-frequency resources using, for example, the bitmap method, on a one-by-one basis. Information for this indication can be composed of several tens of bits according to the number of first components allocated and should be transmitted at high power because all terminals which are allocated the resources should receive the information without fail.

In the present invention, by fixing the number of first components allocated with the first resource allocation scheme and the number of second components allocated with the second resource allocation scheme for a specific period, the base station can reduce a size of the information that it must transmit over a data control channel every TTI.

A description will now be made of the specific embodiments to which the foregoing method is applied.

In the specification, the system in which a base station allocates resources with DRCH and LRCH in a mixed manner will be referred to as a first system, and when the base station allocates resources according to the first system, the first resource allocation scheme means the scheme of allocating channel elements with the DRCH scheme, and the second resource allocation scheme means the scheme of allocating channel elements with the LRCH scheme.

In addition, the system in which a base station allocates resources, or channel elements, with wide-band frequency hopping resources and sub-band frequency hopping resources in a mixed manner will be referred to as a second system, and in the second system, the first resource allocation scheme means the scheme of allocating channel elements with the wide-band frequency hopping resources, and the second resource allocation scheme means the scheme of allocating channel elements with the sub-band frequency hopping resources. Definitions of 'sub-band' and 'wide-band' will be given with reference to FIG. 12.

When resources are allocated in the first system, the number of first components means the number of channel elements allocated with DRCH, and the number of second components means the number of channel elements allocated with LRCH, and when resources are allocated in the second system, the number of first components means the number of channel elements allocated with the wide-band frequency hopping resources, and the number of second components means the number of channel elements allocated with the sub-band frequency hopping resources.

As described above, in an embodiment of the present invention, a terminal can find out an element component ratio of a data channel that the base station transmits for a specific period by receiving a common control channel which is transmitted periodically or non-periodically. For example, according to the first system, the terminal can find out the numbers of DRCHs and LRCHs constituting a forward data channel.

The base station according to an embodiment of the present invention fixes in advance the number of channel elements constituting a data channel for a specific period, transmits information on the number of resource-allocated channel elements over a common control channel, and then uses an identifier whose length is variable according to the predetermined number of channel elements to efficiently indicate to which terminal which channel element is allocated during actual data transmission. That is, the base station uses a variable-length identifier that uses a minimum required number of bits according to the predetermined number of channel elements to efficiently indicate a predetermined number of channel elements.

A description will now be made of two possible schemes in which a base station determines an identifier length of channel elements according to the number of first components and the number of second components of a data channel when an embodiment of the present invention is used in the first system.

(1) For example, when the number of channel elements is less than or equal to $2^n$ and greater than $2^{(n-1)}$, it is possible to indicate each channel element using an identifier with n-bit length. That is, when a data channel can be composed of a total of 40 DRCHs, the base station needs 6 bits to indicate each DRCH. However, when only 10 of the 40 DRCHs are determined to be used, the base station can indicate each DRCH using only 4 bits.

(2) As another example of configuring a variable-length identifier, in the case where a binary tree is used for indicating a particular channel element, when the number of nodes in the binary tree is less than or equal to $2^n$ and greater than $2^{(n-1)}$, it is possible to indicate channel elements corresponding to each tree node using an identifier with n-bit length. This scheme can be applied even to other general methods used for indicating channel elements.

The terminal according to an embodiment of the present invention can find out the number of bits for a length of an identifier indicating a channel element according to the number of channel elements received over a common control channel.

With reference to the annexed drawings, a description will now be made of a process of determining and checking a channel element identifier using the binary tree structure according to an embodiment of the present invention.

This process can be performed in step 604 of FIG. 6, step 704 of FIG. 7, step 806 of FIG. 8, and step 906 of FIG. 9.

Figure 12:
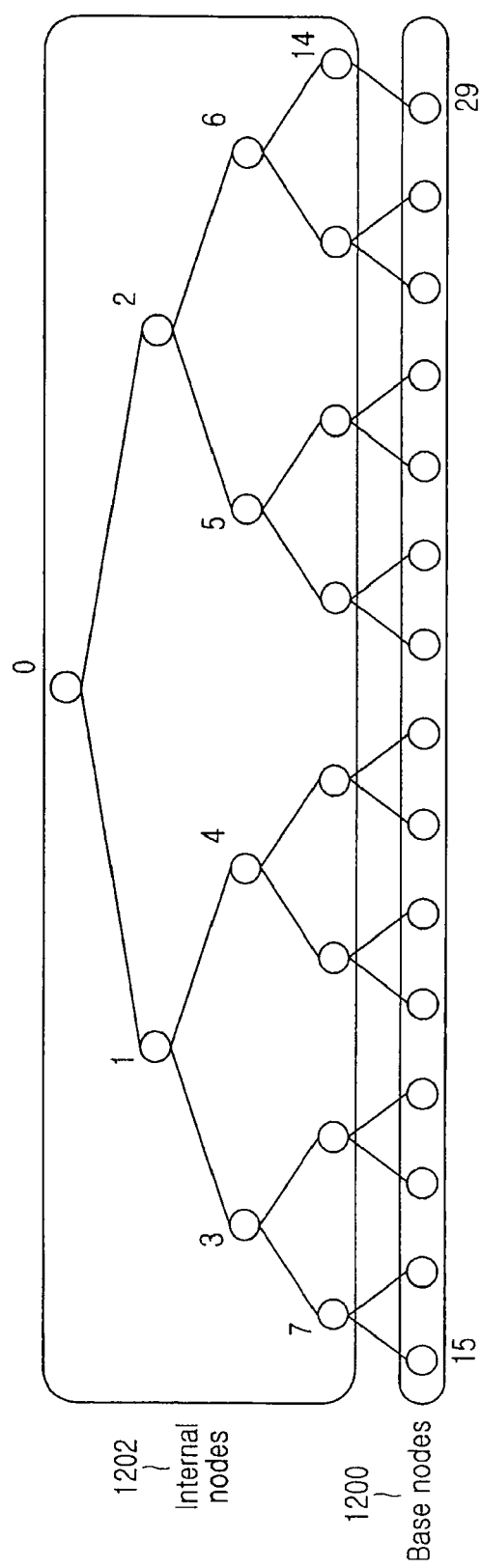
FIG. 12 is a diagram illustrating the concept in which a base station determines the number of channel elements as 15 with use of a binary tree, and transmits the corresponding information to a terminal over a common control channel according to an embodiment of the present invention.

FIG. 12 illustrates the concept in which a base station determines the number of channel elements as 15 with use of a binary tree, and transmits the corresponding information to a terminal over a common control channel according to an embodiment of the present invention. In the case of FIG. 12, the 15 channel elements each are base nodes 1200 of the binary tree, and there are 15 internal nodes 1202 over the base nodes 1200, so the binary tree has a total of 30 tree nodes. Because the total number 30 of nodes is less than $2^5$ and greater than $2^4$, the base station and the terminal can use 5-bit binary numbers '00000'~'11101' as an identifier of each node. That is, FIG. 12 shows that when the tree structure having 30 nodes is used according to an embodiment of the present invention, 5 bits are used for an identifier length for allocating channel elements.

Figure 13:
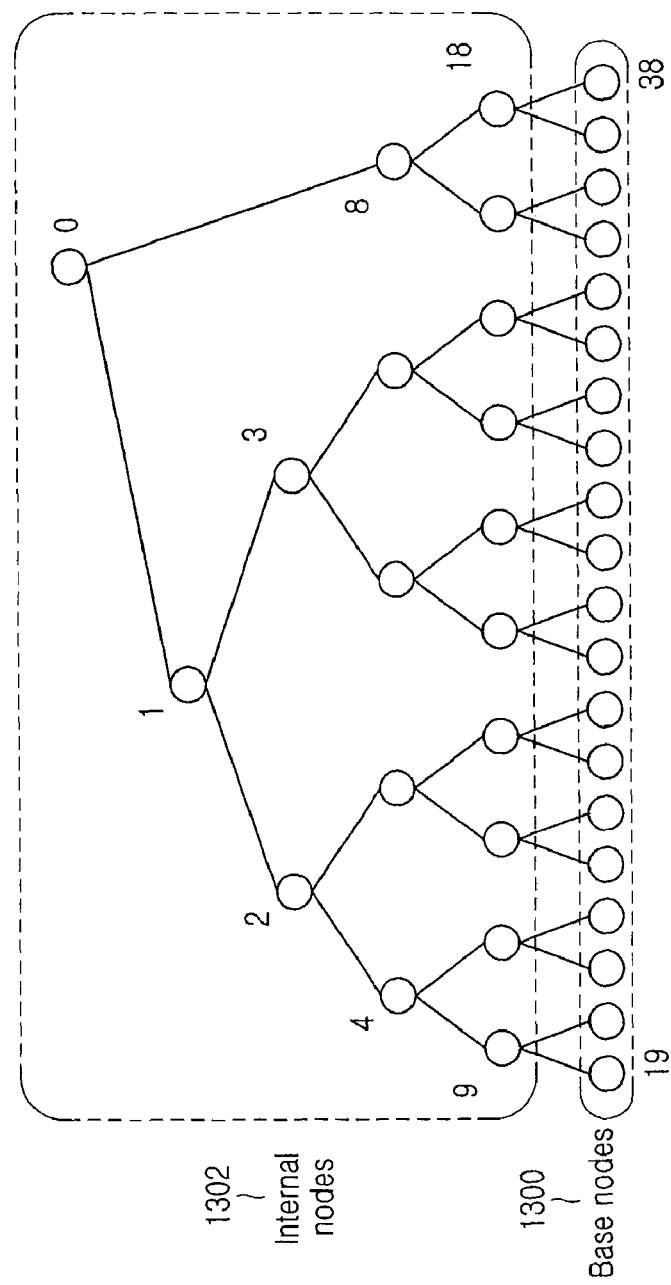
FIG. 13 is a diagram illustrating the concept in which a base station determines the number of channel elements as 20 with use of a binary tree, and transmits the corresponding information to a terminal over a common control channel according to an embodiment of the present invention.

FIG. 13 illustrates the concept in which a base station determines the number of channel elements as 20 with use of a binary tree, and transmits the corresponding information to a terminal over a common control channel according to an embodiment of the present invention.

In this case, the 20 channel elements each are base nodes 1300 of the binary tree, and there are 19 internal nodes 1302 over the base nodes 1300, so the binary tree has a total of 39 tree nodes. Because the total number 39 of nodes is less than $2^6$ and greater than $2^5$, the base station and the terminal can use 6-bit binary numbers '000000'~'100110' as an identifier of each node.

The channel element identifier length decision method of the present invention can be applied not only to the data channel composed of DRCHs and LRCHs in the first system, but also to the data channel composed of wide-band frequency hopping resources and sub-band frequency hopping resources in the second system. That is, FIG. 13 shows that when channel elements are allocated using the 39-node tree structure according to an embodiment of the present invention, an identifier with 6-bit length is used.

Figure 14:
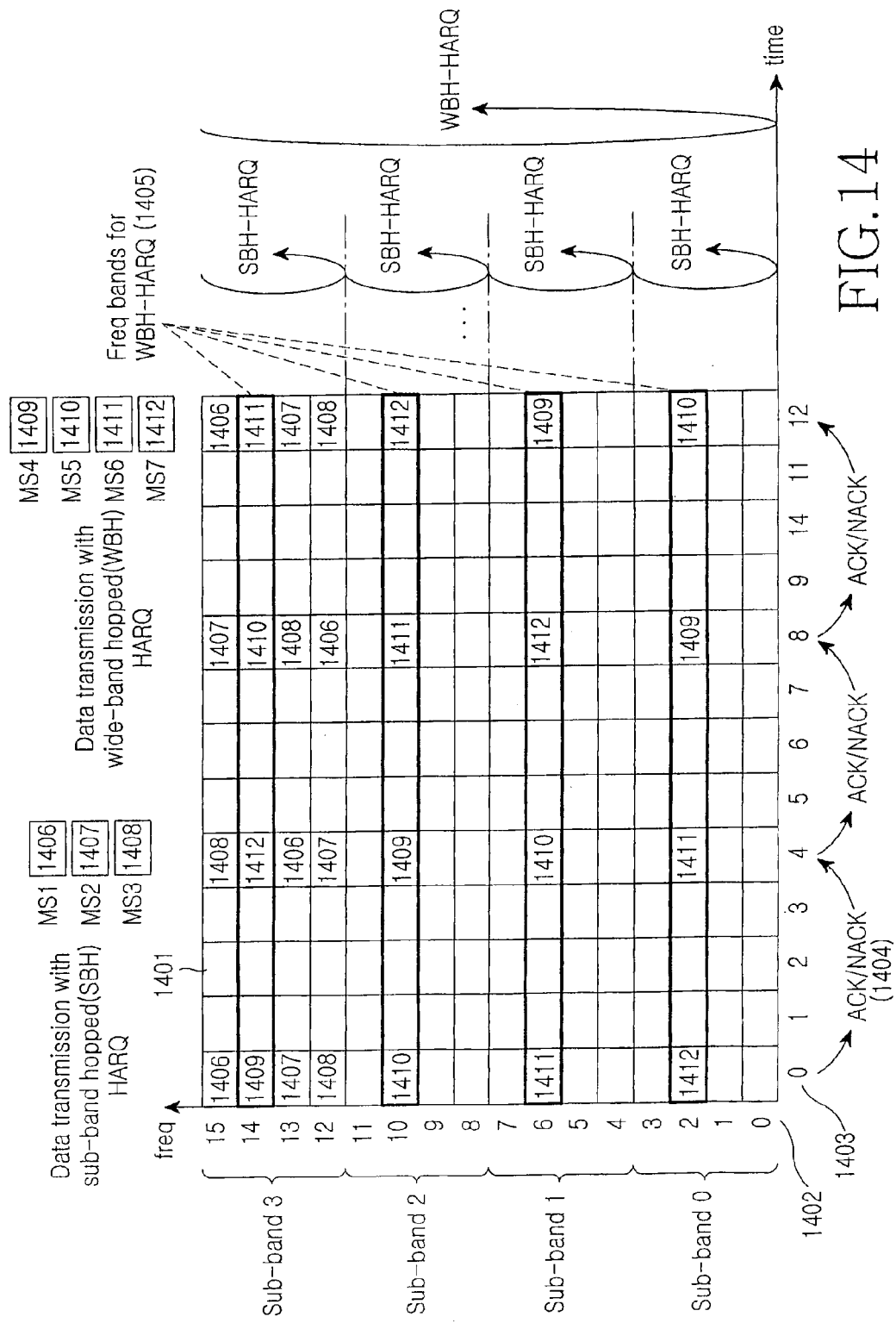
FIG. 14 is a diagram illustrating a method of allocating frequency resources for communication in an OFDMA mobile communication system when an embodiment of the present invention is applied to a second system.

With reference to FIG. 14, a description will now be made of a resource allocation method of a base station when the present invention is applied to the second system. Before the description of the resource allocation method is given, the terms used herein will be defined for convenience.

(1) Sub-band: A sub-band is a unit frequency band in which frequency-selective resource allocation or frequency-selective scheduling is performed. That is, it is assumed that when frequency-selective resource allocation is easy to implement, a resource allocation entity (or scheduler) can determine relative superiority for channel quality in the frequency domain on a sub-band-by-sub-band basis. For example, it is assumed that when the entire system band is 10 MHz and the sub-band is 625 KHz, the resource allocation entity can determine which of the 16 sub-bands existing in the 10-MHz system band is superior.

(2) Wide-band: A wide-band is a band in which the entire system band or the independent resource allocation scheme is managed. For example, in the case where the entire system band is 10 MHz, when resource allocation is managed for the entire 10-MHz band, the wide-band is 10 MHz. However, when the 10-MHz band is divided into two 5-MHz bands and resource allocation is independently managed for the two 5-MHz bands, the wide-band is 5 MHz.

(3) Sub-channel: A sub-channel is a basic unit in which resources are allocated to a particular terminal. The sub-channel is composed of one or multiple sub-carriers in the frequency axis, and one or multiple OFDM symbols in the time axis. It should be noted that the present invention is not limited to any particular sub-channel configuration method.

(4) Slot: A slot is a time-axis unit in which one sub-packet is transmitted. One slot is defined over an OFDM symbol corresponding to one or multiple sub-channels.

Based on the terms defined above, a description will now be made of a resource allocation method when the present invention is applied to the second system.

First, an agreement on the amount of sub-bands is made between a transmitter and a receiver. The agreement is made in such a manner that a base station informs all terminals in the system of the amount of sub-bands. For example, if it is agreed that entire system band is 10 MHz, and the sub-band is 625 KHz, 16 sub-bands exist in the entire system band.

Second, the entire system band is divided into a band for wide-band frequency hopping Hybrid Automatic Repeat reQuest (Wide-band hopped HARQ (WBH-HARQ)), and a band for sub-band frequency hopping HARQ (Sub-band hopped HARQ (SBH-HARQ)). The band for wide-band frequency hopping HARQ (WBH-HARQ) is characterized in that it is uniformly distributed over the entire band. The band for sub-band frequency hopping HARQ (SBH-HARQ) is characterized in that it is the band obtained by excluding the band for wide-band frequency hopping HARQ in a particular sub-band.

Third, the base station allocates to each terminal a part or all of the band for wide-band frequency hopping HARQ, or a part or all of the band for sub-band frequency hopping HARQ. Alternatively, the base station can allocate to one terminal both a part or all of the band for wide-band frequency hopping HARQ, and a part or all of the band for sub-band frequency hopping HARQ.

Fourth, the terminal, allocated a part or all of the band for wide-band frequency hopping HARQ, transmits data while performing frequency hopping only on the band for wide-band frequency hopping HARQ and performing a HARQ operation. However, the terminal, allocated a part or all of the band for sub-band frequency hopping HARQ, performs a HARQ operation while performing frequency hopping in the sub-bands corresponding to the allocated band, and performs the frequency hopping excluding the band designated for wide-band frequency hopping HARQ from the sub-bands.

FIG. 14 illustrates the concept in which an embodiment of the present invention allocates frequency resources with wide-band frequency hopping HARQ and sub-band frequency hopping HARQ, for communication, in an OFDMA mobile communication system.

Referring to FIG. 14, the entire system band in the second system is divided into a band for wide-band frequency hopping HARQ and a band for sub-band frequency hopping HARQ. As described above, the band for wide-band frequency hopping HARQ (WBH-HARQ) is characterized in that it is uniformly distributed over the entire band. The band for sub-band frequency hopping HARQ (SBH-HARQ) is characterized in that it is the band obtained by excluding the band for wide-band frequency hopping HARQ in a particular sub-band.

In the example of FIG. 14, the base station allocates, to each of terminals 1406~1412, a part or all of the band for wide-band frequency hopping HARQ, or a part or all of the band for sub-band frequency hopping HARQ. Alternatively, the base station can allocate, to one terminal, both a part or all of the band for wide-band frequency hopping HARQ and a part or all of the band for sub-band frequency hopping HARQ.

The terminal, allocated a part or all of the band for wide-band frequency hopping HARQ, transmits data while performing frequency hopping only on the band for wide-band frequency hopping HARQ and performing a HARQ operation. However, the terminal, allocated a part or all of the band for sub-band frequency hopping HARQ, performs a HARQ operation while performing frequency hopping in the sub-bands corresponding to the allocated band, and performs the frequency hopping excluding the band designated for wide-band frequency hopping HARQ from the sub-bands.

In FIG. 14, the horizontal axis indicates the time axis and the vertical axis indicates the frequency axis. A small rectangle denoted by reference numeral 1401 indicates one sub-channel. Numerals in the frequency axis, denoted by reference numeral 1402, are the numerals indicating indexing for sub-channels in the frequency domain. Numerals in the time axis, denoted by reference numeral 1403, are the numerals indicating indexing for slots in the time domain.

In the example shown in FIG. 14, one sub-band is composed of 4 sub-channels. That is, a group of sub-channels 0~3 constitutes a sub-band 0, a group of sub-channels 4~7 constitutes sub-band 1, a group of sub-channels 8~11 constitutes sub-band 2, and a group of sub-channels 12~15 constitutes sub-band 3. As described above the entire band is composed of 4 sub-bands and each sub-band is a unit in which frequency-selective resource allocation is achieved. Of the 16 sub-channels, sub-channels 2, 6, 10 and 14 are the sub-channels for which the wide-band frequency hopping HARQ scheme is used. This is shown by reference numeral 1405. In a slot 0, the base station allocates sub-channels to terminals 1~7. In the example of FIG. 14, in the slot 0, the base station allocates a sub-channel 15 to a terminal 1 (or Mobile Station 1 (MS1)) 1406, allocates a sub-channel 13 to a terminal 2 1407, and allocates a sub-channel 12 to a terminal 3 1408. That is, the sub-channels other than the sub-channels for which the wide-band frequency hopping HARQ is used are allocated to the three terminals.

Therefore, the three terminals transmit data while performing frequency hopping in the sub-band corresponding to the sub-channels allocated thereto (in FIG. 14, all of the sub-channels correspond to the sub-band 3) and performing HARQ. It should be noted herein that the terminals perform the frequency hopping in the sub-band corresponding to the allocated sub-channels, other than the sub-channels for which the wide-band frequency hopping HARQ scheme is used. Meanwhile, in the slot 0, the base station allocates a sub-channel 14 to a terminal 4 1409, allocates a sub-channel 10 to a terminal 5 1410, allocates a sub-channel 6 to a terminal 6 1411, and allocates a sub-channel 2 to a terminal 7 1412.

The sub-channel 2, 6, 10 and 14 allocated to the four terminals are the sub-channels for which the wide-band frequency hopping HARQ scheme is used. Therefore, the four terminals perform HARQ while performing frequency hopping in their allocated sub-channels for which the wide-band frequency hopping HARQ scheme is used. Although one terminal is allocated only one sub-channel in the foregoing example, it should be noted that one terminal can be allocated one or more sub-channels.

As described above, in the communication system that configures a data channel with wide-band frequency hopping resources and sub-band frequency hopping resources according to the second system to which an embodiment of the present invention is applied, the base station can efficiently allocate forward and reverse time-frequency resources to multiple terminals using the scheme of the present invention. To this end, each base station in the second system fixes the numbers of wide-band frequency lopping resources and sub-band frequency hopping resources constituting the data channel, and transmits the corresponding information to the terminals over the common channel periodically or non-periodically.

When the base station does not fix the numbers of wide-band frequency hopping resources and sub-band frequency hopping resources for a specific period in this manner, the base station should inform every TTI its all terminals to which it has allocated sub-band frequency hopping resources, as to which wide-band frequency hopping resources they should exclude in configuring sub-band frequency hopping resources, over a data control channel. That is, the base station should indicate all resources allocated for wide-band frequency hopping resources among the time-frequency resources using, for example, the bitmap method on a one-by-one basis.

This information should be transmitted at high power, because the information can have several tens of bits according to the number of allocated wide-band frequency hopping resources, and should be received at all terminals without fail, which are allocated the sub-band frequency hopping resources. In the second system to which an embodiment of the present invention is applied, by fixing the numbers of forward wide-band frequency hopping resources and sub-band frequency hopping resources for a specific period, the base station can reduce the number of information bits that it should transmit over the data control channel every TTI.

Therefore, when an embodiment of the present invention is applied to the second system, the terminal can find out the numbers of wide-band frequency hopping resources and sub-band frequency hopping resources constituting the data channel for a specific period by receiving the common channel which is transmitted periodically or non-periodically.

When an embodiment of the present invention is applied to the second system, the base station fixes in advance the numbers of wide-band frequency hopping resources and sub-band frequency hopping resources constituting the data channel for a specific period, transmits the corresponding information over the common control channel, and then uses an identifier whose length is variable according to the predetermined number of channel elements to efficiently indicate to which terminal which channel element is allocated during actual data transmission.

That is, according to an embodiment of the present invention, the base station uses a variable-length identifier that uses a minimum required number of bits according to the predetermined number of channel elements to efficiently indicate a predetermined number of channel elements. For example, when the number of sub-hand frequency hopping resources is less than or equal to $2^n$ and greater than $2^{(n-1)}$, it is possible to indicate each channel element using an identifier with n-bit length. That is, when a data channel can be composed of a total of 40 sub-band frequency hopping resources, the base station needs 6 bits to indicate each sub-band frequency hopping resource. However, when only 10 of the 40 sub-band frequency hopping resources are determined to be used, the base station can indicate each sub-band frequency hopping resource using only 4 bits. This scheme can also be applied to other general methods used for indicating channel elements.

The terminal according to an embodiment of the present invention can find out the number of bits for a length of an identifier indicating a channel element according to the number of channel elements indicated over the common control channel.

A description will now be made of a scheme of determining a length of a channel element identifier according to the number of available channel elements except for the previously allocated resources when resources are allocated to a particular terminal according to another embodiment of the present invention. In the following description, two possible methods are provided in which the base station determines the number of available channel elements and determines an identifier length according to the number of available channel elements.

First, the present invention provides a scheme in which the base station allocates resources to terminals using multiple DCCHs. Second, the present invention provides a scheme in which the base station determines an identifier length when allocating resources to several terminals using one DCCH. As a first scheme for generating the channel element identifier, the base station according to an embodiment of the present invention transmits a Data Control Channel (DCCH) every TTI to indicate to which terminal how many time-frequency resources for the corresponding TTI are allocated. Generally, a plurality of such data control channels can be defined, and the base station can deliver the information on the resources allocated to a corresponding terminal using different data control channels according to forward reception performance of the terminal.

For example, when the terminal reports the forward reception performance using 15 steps of CQI0~CQI14 and three data control channels DCCH1, DCCH2 and DCCH3 in the TTI are used, the base station can allocate time-frequency resources to the CQI0~CQI4-reporting terminal using the DCCH1, to the CQI5~CQI9-reporting terminal using the DCCH2, and to the CQI10~CQI14-reporting terminal using the DCCH3.

Generally, the terminal transmitting a particular CQI can receive all data control channels corresponding to a CQI lower in level than the particular CQI. That is, because the resource information for the terminal corresponding to the lowest CQI level is received even at the terminal corresponding to any CQI level higher than the lowest CQI level, each terminal determines a length of a channel element identifier according to the amount of the remaining resources, recognizing that only the remaining resources obtained by subtracting the resources allocated to the terminals corresponding to a CQI level lower than its own CQI level from the entire system resources can be allocated to the terminal itself.

Also, in an embodiment of the present invention, the base station for generating a channel element identifier configures a data control channel corresponding to a particular CQI level to minimize the number of bits necessary for each data control channel, and delivers allocation information only for the remaining resources obtained by subtracting the resources allocated by a data control channel with a lower CQI level from the resources for data control channels corresponding to the next CQI level. In addition, the present invention provides a scheme of using a variable-length identifier composed of a minimum number of bits needed to indicate the remaining resources, when indicating the remaining resources obtained by subtracting the resources allocated by the data control channel with a lower CQI level from the resources for a particular data control channel.

For example, when the number of forward DRCHs is fixed to 20 and a binary tree is used for indicating the DRCHs, a total of 39 tree nodes exist as shown in FIG. 13 and a 6-bit ($2^6$=64) identifier is needed to indicate the 39 nodes. In addition, when there are three data control channels DCCH1, DCCH2 and DCCH3 corresponding to the CQI level of the terminal, the DCCH1 should be able to indicate all of the 39 nodes because it is a data control channel corresponding to the lowest CQI level, having no data control channel with a CQI level lower than its own CQI level. Therefore, the DCCH1 should use a 6-bit identifier. When the DCCH1 allocates 5 DRCHs among 20 DRCHs, the total number of DRCHs allocable by the DCCH2 is 15. A total of 30 tree nodes are needed to indicate the 15 DRCHs, as shown in FIG. 12, and a 5-bit identifier is needed to indicate the 30 nodes. Therefore, the DCCH2, unlike the DCCH1, can use the 5-bit identifier rather than the 6-bit identifier. In addition, when the DCCH2 allocates 9 DRCHs among 15 DRCHs to terminals, the total number of DRCHs allocable by the DCCH3 is 6. A total of 11 tree nodes are needed to indicate the 6 DRCHs, and a 4-bit identifier is needed to indicate the 11 nodes. Therefore, the DCCH3, unlike the DCCH1 and the DCCH2, uses the 4-bit identifier, thereby minimizing the number of bits necessary for resource indication.

The terminal according to an embodiment of the present invention receives single or multiple data control channels existing between a data control channel DCCH_0 corresponding to the lowest CQI (CQI 0) and a data control channel DCCH_k corresponding to a particular CQI level that the terminal has reported. The terminal, when analyzing a particular data control channel DCCH_x, first analyzes its lower data control channels to determine information on the resources allocated in the lower data control channels, and can analyze the data control channel DCCH_x, assuming that allocation information only for the remaining resources except for the allocated resources is included in the data control channel DCCH_x. In the embodiment of the present invention, the terminal according to the first method for determining a channel element identifier can determine a size or length (y bits) of a resource identifier composed of a minimum number of bits needed for indicating the remaining resources obtained by subtracting the resources allocated by lower-level data control channels from the resources for a particular data control channel DCCH_x. After determining the size or length of the channel element identifier, the terminal can analyze a particular data control channel using the information, and acquire information on the resources allocated to the terminal itself.

In addition, a detailed description will now be made of a method for determining a channel element identifier length when allocating resources to multiple terminals using one data control channel in the embodiment of the present invention. When allocating resources to multiple terminals over a particular data control channel to minimize the number of bits necessary for each data control channel, the base station according to the embodiment of the present invention provides a scheme of delivering allocation information only for the remaining resources other than the resources allocated to other terminals before resource allocation to the corresponding terminal, to each terminal over the corresponding data control channel. Also, when indicating the remaining resources other than the resources allocated to other terminals, the base station provides a scheme of using a variable-length identifier composed of a minimum number of bits needed to indicate the remaining resources.

For example, when the number of forward DRCHs is fixed to 20 and the binary tree is used for indicating the DRCHs, there are a total of 39 tree nodes as shown in FIG. 13 and a 6-bit identifier is needed to indicate the 39 nodes. When there are three data control channels DCCH1, DCCH2 and DCCH3 corresponding to the CQI level of the terminal, the DCCH1 should be able to indicate all of the 39 nodes because it is a data control channel corresponding to the lowest CQI level, having no data control channel with a CQI level lower than its own CQI level. When allocating, 5 DRCHs and 2 DRCHs to two different terminals over the DCCH1, the base station should use a 6-bit DRCH identifier because the total number of nodes allocable to the first terminal is 39. As for the second terminal, a total of 15 DRCHs can be allocated to the second terminal because 5 DRCHs halve already been allocated to the first terminal. A total of 30 tree nodes are needed for indicating the 15 DRCHs as shown in FIG. 12, and a 5-bit identifier is needed for indicating the 30 nodes. Therefore, to indicate the DRCHs allocated to the second terminal, the base station can use a 5-bit DRCH identifier rather than a 6-bit DRCH identifier.

In the present invention, upon receiving a particular data control channel DCCH_x used for allocating resources to multiple terminals, the terminal can analyze the received data control channel for each terminal included in the data control channel DCCH_x, assuming that allocation information only for the remaining resources other than the resources allocated to other terminals before resource allocation to the terminal that has received the particular data control channel is transmitted over the data control channel. The terminal according to an embodiment of the present invention can determine that in a particular data control channel, the resource allocation identifier used for allocating resources to a particular terminal is composed of a minimum number of bits necessary for indicating the resources available to the corresponding terminal. After determining a size or length of the channel element identifier, the terminal can analyze resource allocation information for a particular terminal using the information, and acquire information on the resources allocated to the terminal.

As is apparent from the foregoing description, according to the present invention, the OFDMA mobile communication system can efficiently allocate forward time-frequency resources to multiple terminals.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for receiving resources allocated from a base station by a terminal in an Orthogonal Frequency Division Multiple Access (OFDMA) mobile communication system, the method comprising:

receiving, for a data channel, information of a number of first components, which indicates an amount of resources used with a first resource allocation scheme, and a number of second components, which indicates an amount of resources used with a second resource allocation scheme, from the base station over a common control channel;

determining first and second identifier lengths of channel elements for the first and second resource allocation schemes according to the information of the number of first components and the number of second components;

receiving, using one of the first and the second identifier lengths, resource allocation information including a channel element identifier indicating at least one channel element allocated to the terminal, over a data control channel; and transmitting or receiving data over a resource of a channel element indicated by the received identifier.

2. The method of claim 1, wherein the number of first components is a number of channel elements allocated with a Distributed Resources Channel (DRCH), and the number of second components is a number of channel elements allocated with a Localized Resources Channel (LRCH).

3. The method of claim 1, wherein the number of first components is a number of channel elements allocated with wide-band frequency hopping, and the number of second components is a number of channel elements allocated with sub-band frequency hopping.

4. The method of claim 1, wherein the resource allocation information includes at least one channel element identifier having an identifier length based on one of the first and second resource allocation schemes applied to the terminal, among the identifier lengths.

5. The method of claim 1, wherein the identifier indicating at least one channel element has, based on the determined identifier length, a variable identifier length within the resource allocation information according to a number of allocable channel elements.

6. The method of claim 1, wherein the number of first components and the number of second components are valid for a specific period.

7. A method for allocating resources to at least one terminal by a base station in an Orthogonal Frequency Division Multiple Access (OFDMA) mobile communication system, the method comprising:

determining, for a data channel, a number of first components, which indicates an amount of resources used with a first resource allocation scheme, and a number of second components, which indicates an amount of resources used with a second resource allocation scheme;

transmitting information of the number of first components and the number of second components to the terminal over a common control channel;

determining identifier lengths of channel elements for the first and second resource allocation schemes according to the number of first components and the number of second components;

transmitting, using one of the identifier lengths, resource allocation information including a channel element identifier indicating at least one channel element allocated to the terminal, over a data control channel; and transmitting or receiving data over a resource of a channel element corresponding to the identifier.

8. The method of claim 7, wherein the number of first components is a number of channel elements allocated with a Distributed Resources Channel (DRCH), and the number of second components is a number of channel elements allocated with a Localized Resources Channel (LRCH).

9. The method of claim 7, wherein the number of first components is a number of channel elements allocated with wide-band frequency hopping, and the number of second components is a number of channel elements allocated with sub-band frequency hopping.

10. The method of claim 7, wherein the identifier indicating at least one channel element has, based on the determined identifier length, a variable identifier length within the resource allocation information according to a number of allocable channel elements.

11. The method of claim 7, wherein the resource allocation information includes at least one channel element identifier having an identifier length based on one of the first and the second resource allocation schemes applied to the terminal, among the identifier lengths.

12. The method of claim 7, wherein the number of first components and the number of second components are valid for a specific period.

13. A terminal apparatus for receiving resources allocated from a base station in an Orthogonal Frequency Division Multiple Access (OFDMA) mobile communication system, the terminal apparatus comprising:

a reception unit for receiving a signal transmitted by the base station;

a control channel decoder for decoding a common control channel signal among the signals output from the reception unit, and outputting, for a data channel, information of a number of first components, which indicates an amount of resources used with a first resource allocation scheme, and a number of second components, which indicates an amount of resources used with a second resource allocation scheme; and a controller for determining identifier lengths of channel elements according to the information of the number of first components and the number of second components, and receiving resource allocation information.

14. The terminal apparatus of claim 13, wherein the number of first components is a number of channel elements allocated with a Distributed Resources Channel (DRCH), and the number of second components is a number of channel elements allocated with a Localized Resources Channel (LRCH).

15. The terminal apparatus of claim 13, wherein the number of first components is a number of channel elements allocated with wide-band frequency hopping, and the number of second components is a number of channel elements allocated with sub-band frequency hopping.

16. The terminal apparatus of claim 13, wherein the number of first components and the number of second components are valid for a specific period.

17. A base station apparatus for allocating resources to at least one terminal in an Orthogonal Frequency Division Multiple Access (OFDMA) mobile communication system, the base station apparatus comprising:

a downlink scheduler and controller for generating information on resources to be allocated to the terminal, for determining, for a data channel, a number of first components, which indicates an amount of resources used with a first resource allocation scheme, and it number of second components, which indicates an amount of resources used with a second resource allocation scheme, determining a length of a channel element identifier according to the number of first components and the number of second components constituting the data channel, and for generating an identifier indicating at least one channel element to be allocated to transmit data to the terminal using the identifier length;

a common control channel symbol generator for transmitting information of the number of first components and the number of second components over a common control channel; and a control channel symbol generator for transmitting resource allocation information including the generated identifier.

18. The base station apparatus of claim 17, wherein the number of first components is a number of channel elements allocated with a Distributed Resources Channel (DRCH), and the number of second components is a number of channel elements allocated with a Localized Resources Channel (LRCH).

19. The base station apparatus of claim 17, wherein the number of first components is a number of channel elements allocated with wide-band frequency hopping, and the number of second components is a number of channel elements allocated with sub-band frequency hopping.

20. The base station apparatus of claim 17, wherein the resource allocation information includes at least one channel element identifier having an identifier length based on one of the first and the second resource allocation schemes applied to the terminal, among the identifier lengths.

21. The base station apparatus of claim 17, wherein the identifier indicating at least one channel element has, based on the determined identifier length, a variable identifier length within the resource allocation information according to a number of allocable channel elements.

22. The base station apparatus of claim 17, wherein the number of first components and the number of second components are valid for a specific period.

23. A terminal apparatus for receiving resources allocated from a base station in an Orthogonal Frequency Division Multiple Access (OFDMA) mobile communication system, the terminal apparatus comprising:

means for receiving a signal transmitted by the base station;

means for decoding a common control channel signal among the signals output from the reception unit, and outputting, for a data channel, information of a number of first components, which indicates an amount of resources used with a first resource allocation scheme, and a number of second components, which indicates an amount of resources used with a second resource allocation scheme; and means for determining identifier lengths of channel elements according to the information of the number of first components and the number of second components, and receiving resource allocation information.

24. The terminal apparatus of claim 23, wherein the number of first components is a number of channel elements allocated with a Distributed Resources Channel (DRCH), and the number of second components is a number of channel elements allocated with a Localized Resources Channel (LRCH).

25. The terminal apparatus of claim 23, wherein the number of first components is a number of channel elements allocated with wide-band frequency hopping, and the number of second components is a number of channel elements allocated with sub-band frequency hopping.

26. The terminal apparatus of claim 23, wherein the number of first components and the number of second components are valid for a specific period.

27. A base station apparatus for allocating resources to at least one terminal in an Orthogonal Frequency Division Multiple Access (OFDMA) mobile communication system, the base station apparatus comprising:

means for generating information on resources to be allocated to the terminal, for determining, for a data channel, a number of first components, which indicates an amount of resources used with a first resource allocation scheme, and a number of second components, which indicates an amount of resources used with a second resource allocation scheme, determining a length of a channel element identifier according to the number of first components and the number of second components constituting the data channel, and for generating an identifier indicating at least one channel element to be allocated to transmit data to the terminal using the identifier length;

means for transmitting information of the number of first components and the number of second components over a common control channel; and means for transmitting resource allocation information including the generated identifier.

28. The base station apparatus of claim 27, wherein the number of first components is a number of channel elements allocated with a Distributed Resources Channel (DRCH), and the number of second components is a number of channel elements allocated with a Localized Resources Channel (LRCH).

29. The base station apparatus of claim 27, wherein the number of first components is a number of channel elements allocated with wide-band frequency hopping, and the number of second components is a number of channel elements allocated with sub-band frequency hopping.

30. The base station apparatus of claim 27, wherein the resource allocation information includes at least one channel element identifier having an identifier length based on one of the first and the second resource allocation schemes applied to the terminal, among the identifier lengths.

31. The base station apparatus of claim 27, wherein the identifier indicating at least one channel element has, based on the determined identifier length, a variable identifier length within the resource allocation information according to a number of allocable channel elements.

32. The base station apparatus of claim 27, wherein the number of first components and the number of second components are valid for a specific period.

* * * * *